(12) United States Patent
Aggarwal et al.

(10) Patent No.: US 12,709,236 B2
(45) Date of Patent: Aug. 18, 2026

(54) HIGH RELIABILITY, HIGH PRECISION, RELEASABLE MOUNTING SYSTEMS AND METHODS

(71) Applicant: Heath Consultants Incorporated, Houston, TX (US)

(72) Inventors: Vineet Aggarwal, Richmond, TX (US); Alan Kenneth Stratton, Milford, NH (US); Kevin Bendele, Seabrook, TX (US); Jeffrey Parker, La Grange, TX (US); Christopher Gretencord, Friendswood, TX (US); Leo Belval, Clear Lake, TX (US); Steve Chancey, Houston, TX (US); Haining Dong, Houston, TX (US); Marshall Bronfin, Bedford, NH (US)

(73) Assignee: Heath Consultants Incorporated, Houston, TX (US)

( * ) Notice: Subject to any disclaimer, the term of this patent is extended or adjusted under 35 U.S.C. 154(b) by 456 days.

(21) Appl. No.: 18/477,285

(22) Filed: Sep. 28, 2023

(65) Prior Publication Data

US 2024/0034246 A1 Feb. 1, 2024

Related U.S. Application Data

(63) Continuation-in-part of application No. 18/139,304, filed on Apr. 25, 2023.

(Continued)

(51) Int. Cl.

*F16B 47/00* (2006.01)
*B60R 11/02* (2006.01)

(Continued)

(52) U.S. Cl.

CPC .......... *B60R 11/0258* (2013.01); *F16B 47/00* (2013.01); *G01D 11/30* (2013.01);

(Continued)

(58) Field of Classification Search

CPC ........ F16B 47/00; F16B 2200/83; F16B 1/00; F16B 47/006; F16M 13/022

(Continued)

(56) References Cited

U.S. PATENT DOCUMENTS 3,082,982 A 3/1963 Moskowitz
4,489,239 A 12/1984 Grant et al.

(Continued)

FOREIGN PATENT DOCUMENTS

CN 101876335 A 11/2010
CN 205081213 U 3/2016

(Continued)

OTHER PUBLICATIONS

Extended European Search Report, Application No. 23797171.8, Feb. 24, 2026, 8 pages.

(Continued)

*Primary Examiner* — Alfred J Wujciak
(74) *Attorney, Agent, or Firm* — Douglas W. Rommelmann; Grable Martin PLLC

(57) ABSTRACT

A releasable mounting system and method for semi-permanently attaching to a ferrous material surface, comprising a base assembly having a plurality of magnetic-assisted suction cup (MASC) mounting assemblies connected to a base plate for semi-permanently attaching to the ferrous material surface. Each MASC mounting assembly has a suction cup and at least one magnet providing additional fixturing of the base assembly to the ferrous material surface. The system may include a rooftop assembly comprising a shell and a pivotally mounted mast assembly biased in an upright (Continued)

position. The rooftop assembly on a vehicle rooftop may include sensors providing information to a computer inside the vehicle, including information with respect to the orientation of the mast on top of the vehicle during a mobile survey. All of the data gathered from the rooftop assembly may be wirelessly communicated to the computer inside the vehicle.

19 Claims, 20 Drawing Sheets

Related U.S. Application Data

(60) Provisional application No. 63/334,547, filed on Apr. 25, 2022.

(51) Int. Cl.
*F16B 1/00* (2006.01)
*G01D 11/30* (2006.01)
*G01D 21/02* (2006.01)
*B60R 11/00* (2006.01)

(52) U.S. Cl.
CPC ........ *G01D 21/02* (2013.01); *B60R 2011/004* (2013.01); *B60R 2011/0056* (2013.01); *B60R 2011/0057* (2013.01); *F16B 1/00* (2013.01); *F16B 2200/83* (2023.08)

(58) Field of Classification Search
USPC ............. 248/683, 206.2, 206.3, 205.5, 206.5
See application file for complete search history.

(56) References Cited

U.S. PATENT DOCUMENTS

| | | | |
|---|---|---|---|
| 5,423,466 | A | 6/1995 | Moon |
| 5,516,019 | A | 5/1996 | Moon |
| 6,213,440 | B1 | 4/2001 | Kornback |
| 6,822,236 | B1 | 11/2004 | Nelson et al. |
| 7,075,653 | B1 | 7/2006 | Rutherford |
| 8,780,549 | B2 | 7/2014 | Aldana |
| 9,797,798 | B2 | 10/2017 | Frish |
| 10,641,314 | B1 | 5/2020 | Fan |
| 2005/0134859 | A1 | 6/2005 | Kalayeh et al. |
| 2006/0044562 | A1 | 3/2006 | Hagene et al. |
| 2015/0108134 | A1 | 4/2015 | Fangyuan |
| 2016/0025264 | A1 | 1/2016 | Casagrande |
| 2019/0341670 | A1 | 11/2019 | Blennius |

FOREIGN PATENT DOCUMENTS

| | | | |
|---|---|---|---|
| CN | 110780326 | A | 2/2020 |
| CN | 210634468 | U | 5/2020 |
| CN | 214890289 | U | 11/2021 |
| CN | 113904098 | A | 1/2022 |
| JP | H0567518 | A | 3/1993 |
| JP | 2020515464 | A | 5/2020 |
| JP | 6991675 | B2 | 1/2022 |
| KR | 20140144795 | A | 12/2014 |
| KR | 20150031516 | A | 3/2015 |
| KR | 20160085548 | A | 7/2016 |

OTHER PUBLICATIONS

ABB Inc., “MobileGuard™ Natural Gas Leak Detection System” brochure, 2020, 8 pages (PB_MobileGuard Brochure-EN_A4.pdf (abb.com)).

International Search Report and Written Opinion issued in International Application No. PCT/US2023/019791, report mail date Aug. 29, 2023; pp. 1-10.

International Search Report and Written Opinion issued in International Application No. PCT/US2023/019875, report mail date Aug. 23, 2023; pp. 1-14.

Picarro, Inc., “Picarro Natural Gas Asset Management Solution—Techology Brief”, 2019, Picarro.

HIGH RELIABILITY, HIGH PRECISION, RELEASABLE MOUNTING SYSTEMS AND METHODS

CROSS-REFERENCE TO RELATED APPLICATIONS

This application is a continuation-in-part application of U.S. application Ser. No. 18/139,304 filed on Apr. 25, 2023, which claims the benefit of U.S. Provisional Application Ser. No. 63/334,547 filed on Apr. 25, 2022. Applicant incorporates by reference herein Application Ser. No. 18/139,304 and 63/334,547 in their entireties.

BACKGROUND OF THE INVENTION

1. Field of the Invention

The present invention relates generally to releasable mounting systems, and more particularly relates to high reliability, high precision releasable mounting systems. The present invention also relates to releasable mounting systems for a vehicle rooftop, and more particularly relates to high reliability, high precision releasable mounting systems for a vehicle rooftop.

2. Description of the Related Art

There are numerous examples of situations requiring precision positioning of a vehicle and knowing precisely the location of the vehicle at a given point in time and/or during a mobile survey.

One commonly known technique for accomplishing such precision is via satellite navigation. Satellite navigation is a system of satellites that provides autonomous geo-spatial positioning with global coverage. Small electronic receivers determine location (longitude, latitude, and altitude/elevation) using time signals transmitted from the satellites. Global Navigation Satellite System ("GNSS") is the standard generic term for satellite navigation systems that provide autonomous geo-spatial positioning with global coverage. While satellite navigation is highly precise and weather independent, it has some drawbacks. Its signals may be shielded and positioning accuracy adversely affected and/or disabled in various situations, such as in tunnels and heavily forested roads. Additionally, the output frequency of satellite navigation is limited which may affect the speed and strong mobility required in certain environments. One way to combat these shortcomings is to combine inertial navigation and satellite navigation.

An Inertial Navigation System ("INS") is an autonomous navigation system that does not rely on external information but belongs to the dead reckoning navigation mode, i.e., the position of the next point is reckoned from the position of a known point according to the continuously measured course angle and speed of the moving body, thus the current position of the moving body can be continuously measured. However, inertial navigation systems have some drawbacks, among them is that the navigation information is generated through integration, so the positioning error is increased along with the time, and the long-term accuracy is poor.

The GNSS/INS integrated navigation system uses an integrated navigation algorithm to integrate the information of the inertial navigation unit and the information of the satellite navigation system to compensate the error of the inertial element and correct the position, the speed and the attitude signal of the carrier, thereby forming the integrated navigation system with high precision, compact structure and low cost.

One example of where the GNSS/INS integrated navigation system has application is when doing mobile surveys, as for example mobile surveys to detect the location of natural gas emissions and/or leaks from a distant source with a high degree of accuracy. In such instances it may also be desirable to place an anemometer on a mast mounted to the vehicle rooftop. The mast may extend three feet or more vertically above the rooftop. There are clear opportunities for damage to occur to the anemometer positioned at such a height above the vehicle rooftop and/or damage to the vehicle. An anemometer on a tall mast tends to hit low lying objects when the vehicle is in motion, including, for example, a tree limb, garage clearance, drive through clearance to name a few. In such cases, the anemometer may get damaged, the mast may break and cause damage to the vehicle, and there is a potential risk of injury.

It would be desirable to have a system and method of incorporating an anemometer, GNSS/INS and other sensors in a single system to be mounted on a vehicle rooftop. It would be further desirable to have a system and method incorporating sensors on top of a moving vehicle and ensuring consistency in accuracy of lever arms configuration of GNSS/INS while also ensuring sub-meter location accuracy. It is further desirable that the system and method minimize damage to the tall anemometer mast and the vehicle in case of an obstacle hitting the moving vehicle and/or anemometer mast. It would be further desirable to have roof top positioned sensors obtaining information such as temperature and pressure, humidity, wind speed/direction and position (i.e., orientation) of the mast, and more preferably that such information be transmitted wirelessly to a tablet or computer inside the vehicle.

SUMMARY OF THE INVENTION

The present invention solves the problem of deploying cost-effective mount devices that, during mobile survey of geo-locational devices requiring precision in detecting various factors with respect to precise location, protect the sensitive devices from damage.

One aspect of a preferred embodiment of the present invention comprises addressing significant configuration and installation steps of a GNSS/INS system on a vehicle while ensuring accuracy and achieving this with ease during installation.

An aspect of a preferred embodiment is the development of a rooftop station with a semi-permanent base plate that can be fixed at a particular point on the vehicle rooftop by aligning one of its edges to the vehicle longitudinal axis. The rooftop station ensures location of a GNSS/INS receiver at a fixed distance from a GNSS antenna and the vehicle axis of rotation (typically the center of the vehicle rear axle). The rooftop station is fixed to the vehicle in such a way that the 3 axis offset of the GNSS/INS system from the GNSS antenna is fixed and the 3 axis offset of the INS system (Inertial Measurement Unit IMU embedded within the GNSS/INS receiver) with respect to vehicle center of axis of rotation is fixed.

One aspect of a preferred embodiment of the present invention comprises a housing for the GNSS antenna and anemometer together and mounting the GNSS antenna on top of the anemometer in such a way that the GNSS antenna is a fixed distance in x, y and z directions from the GNSS/INS receiver. Preferably, the antenna is the highest object so that it receives a good GNSS signal and is at a fixed distance to allow for accurate calculations. In a preferred embodiment, the GNSS/INS receiver has a micro-processor/controller that performs calculations using satellite signals and provides connectivity of data to a tablet or smart phone. The GNSS antenna captures the radio signals from satellites and preferably amplifies them before passing them to the GNSS/INS receiver.

Another aspect of a preferred embodiment of the present invention is that the entire rooftop station is mounted on a semi-permanent mount which is fixed to the vehicle rooftop using magnetic-assisted suction cups. Preferably, a plurality of magnets are in a raised or "parked" position for initial installation of the semi-permanent base plate so that the magnets don't interfere with the positioning of the semi-permanent base plate on a ferrous roof. Once the semi-permanent base plate is properly positioned and the suction cups are attached to the roof, the magnets are then lowered and provide addition attachment to the roof. The magnets provide additional attachment to the ferrous roof in the event the suction cups fail.

An anemometer mast, preferably about 40" long, but may be 10-20 inches longer or shorter, is mounted to the rooftop station such that it is biased in a vertical orientation; however, the mast can pivot backward or forward along the longitudinal axis of the vehicle in the event it accidentally hits an obstruction such as tree branch, thus preventing damage to the instrument and to the vehicle.

Another aspect of a preferred embodiment is that the anemometer mast is positioned with magnets in the rooftop station so that in case an object hits the anemometer and/or mast, the mast can pivot and fall towards the vehicle rooftop preventing damage. The fall is broken or dampened by a dampener in the rooftop station in the axis and/or by repulsive magnets positioned in the rooftop station.

Another aspect of a preferred embodiment is that the rooftop station includes sensors providing information inside the vehicle with respect to the orientation of the mast on top of the vehicle during a mobile survey. In a preferred embodiment, all of the data gathered from the rooftop station is wirelessly communicated to a computer or tablet inside the vehicle.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

Figure 1:
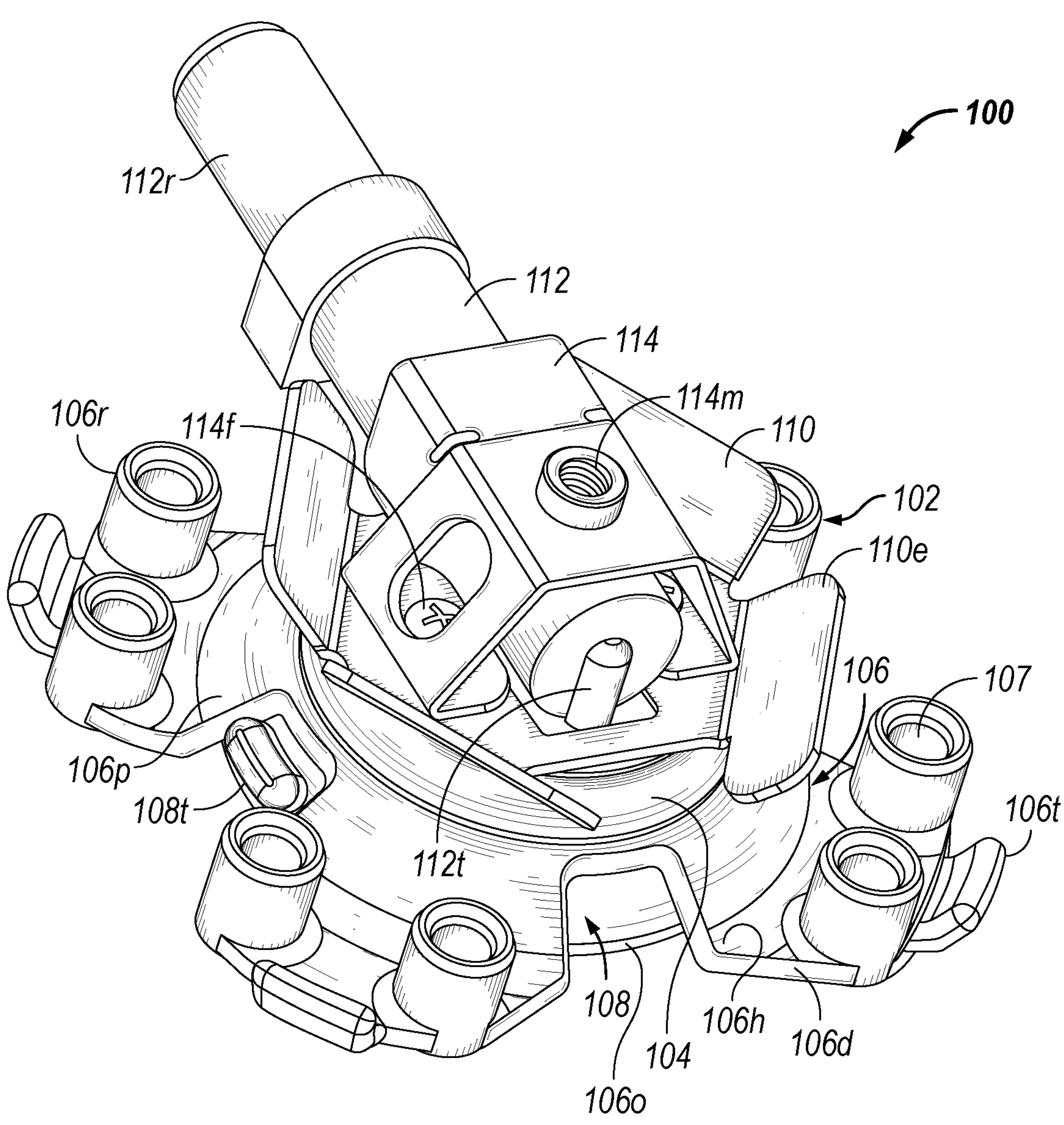
FIGS. 1 and 2 are perspective views of a magnetic-assisted suction cup (MASC) mounting assembly.

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Referring to FIGS. 1-4, one embodiment of a magnetic-assisted suction cup (MASC) mounting assembly 100 is shown. Preferably, the MASC mounting assembly 100 comprises a retaining assembly 102 having a generally circular central frustoconical portion 104 having a planer upper surface 104*s* and a plurality of uniformly spaced fingers 106 extending downwardly and radially from the lower end of the frustoconical portion 104 and defining an opening 106*o* between adjacent fingers 106. Preferably, the retaining assembly 102 is made of a durable elastomeric polymer, as for example silicone, and molded into shape. The fingers 106 include a distal portion 106*d* and a proximal portion 106*p* joined by a hinge 106*h*. The hinge 106*h* may be a flex hinge formed in the molding process. The distal portion 106*d* preferably has a substantially smooth planer lower surface 106*s*.

Preferably, the distal portion 106*d* of each finger 106 includes one or more receptacles 106*r* for receiving a magnet 107. The receptacles 106*r* may include a cover for enclosing the magnet 107 within the receptacle 106*r*. A tab 106*t* is preferably located at the distal end of each finger 106.

The MASC mounting assembly 100 also preferably includes a suction cup 108, a storage plate 110, a suction pump 112, and a pump bracket 114. The suction cup 108 is received within the frustoconical portion 104 and the downward radially extending proximal portions 106*p* of the fingers 106. The suction cup 108 may include one or more lift tabs 108*t* adjacent the outer perimeter of the suction cup 108. The lift tabs 108*t* may be used to pull up on the suction cup 108 to release the pressure or suction between the suction cup 108 and a surface to which it is attached. Preferably, the lift tabs 108*t* are positioned within the openings 106*o* between adjacent fingers 106 for ease of access.

The storage plate 110 comprises a base 110*b* and a plurality of ears 110*e*. The base 110*b* is adapted to be positioned on the planer upper surface 104*s* of the frustoconical portion 104. The ears 110*e* preferably extend upwardly and outwardly from the base 110*b*. The ears 110*e*, or at least a portion of the ears 110*e*, are made of a ferromagnetic metal or include a ferromagnetic metal.

Preferably, the suction pump 112 includes a pump rod 112*r*, check valve and tubular insert 112*t*. The pump rod 112*r* is pumped to draw a vacuum between the suction cup 108 and the surface to which it is attached or being attached. The tubular insert 112*t* is in sealed engagement with the suction cup 108. The suction pump 112 may be used to provide and maintain the vacuum between the suction cup 108 and the surface to which it is attached and the check valve allows repumping without the loss of remaining vacuum.

The pump bracket 114 secures the suction pump 112 in place. Fasteners 114*f* may be used to secure the MASC mounting assembly 100 together. As one example, a pair of fasteners 114*f* may extend through holes in the pump bracket 114, storage plate 110, upper surface 104*s* of the frustoconical portion 104, and into the suction cup 108 to secure the components together. It is to be understood that other fastening arrangements are possible and within the scope of the present invention. Additionally, the pump bracket 114 includes an accessory mount 114*m* adapted for the attachment of or to other devices as will be discussed in detail later. The accessory mount 114*m* may be a threaded member, such as a nut or stud, or a clamp device.

It is to be understood that suction cup with vacuum pump assemblies are commercially available. One company providing such products is Woods Powr-Grip Co., Inc. of Laurel, Montana. Woods Powr-Grip has vacuum suction cup products having a check valve that allows repumping without the loss of remaining vacuum and also a red-line indicator on the pump rod to warn the user of any vacuum loss. Such features are desirable features in the present invention.

Figure 2:
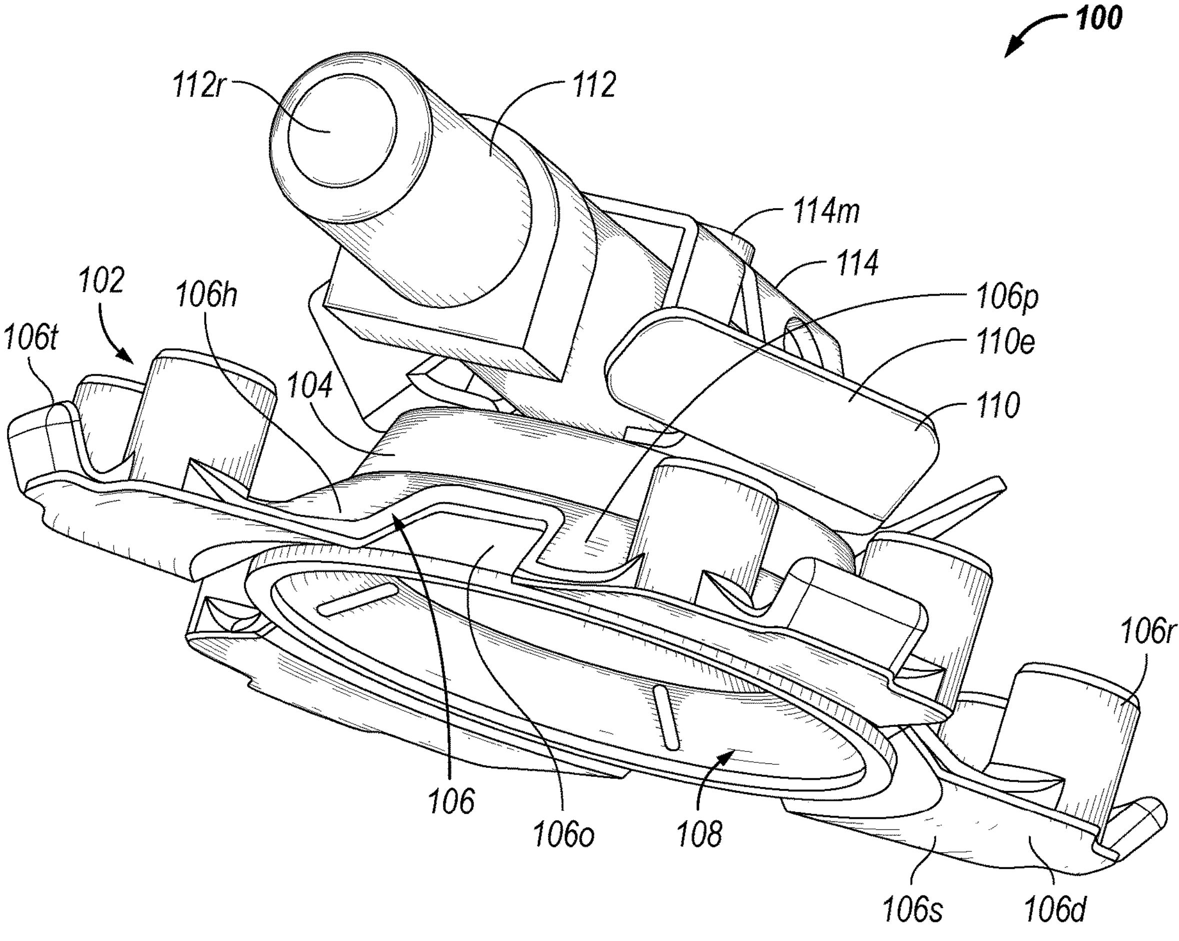
Figure 3:
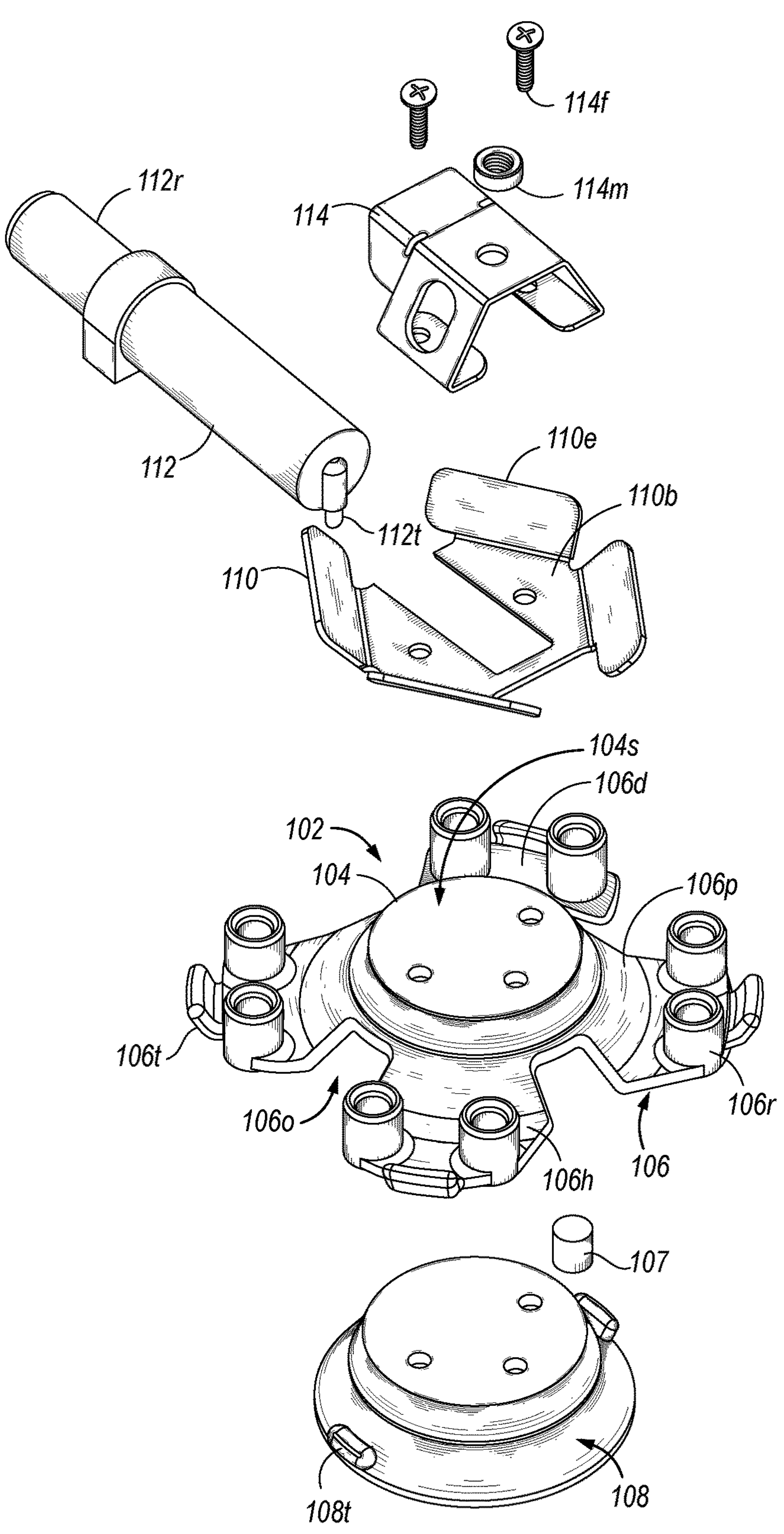
FIG. 3 is an exploded view of the MASC mounting assembly shown in FIGS. 1 and 2.
Figure 4:
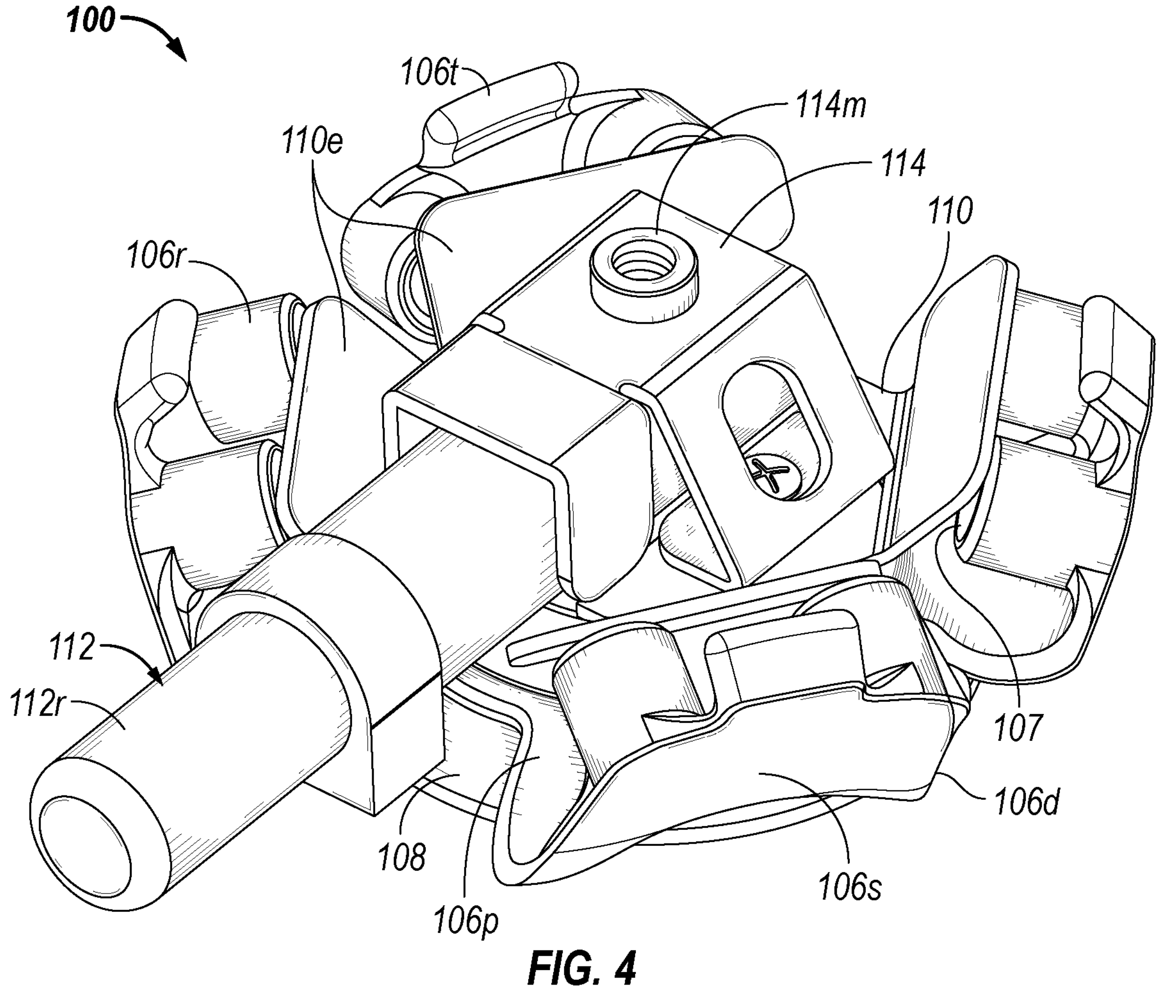
FIG. 4 is a perspective view showing the MASC mounting assembly with a distal end of a plurality of fingers in a parked position.

As shown in FIGS. 3 and 4, the number of ears 110*e* of the storage plate 110 is preferably the same as the number of fingers 106 of the retaining assembly 102. Referring to FIGS. 1, 2 and 4, the angle and placement of the ears 110*e* of the storage plate 110 in the assembled condition of the MASC mounting assembly 100 is such that the upper end of the magnet receptacles 106*r* is allowed to contact or be adjacent to the ears 110*e* when the distal portion 106*d* of the fingers 106 are rotated upwardly about the hinge 106*h*. As shown in FIG. 4, the distal portion 106*d* of the fingers 106 will remain in this "parked" or raised position as a result of magnetic attraction between the magnets 107 and the ferromagnetic ears 110*e*.

In a preferred embodiment, during the process of attaching the MASC mounting assembly 100 to a ferrous metal surface, the distal portion 106*d* of the fingers 106 are in the "parked" position to allow for ease of movement in positioning the MASC mounting assembly 100 on the ferrous metal surface. With the suction cup 108 positioned at the desired location on the ferrous metal surface, the pump 112 is used to draw a vacuum between the suction cup 108 and the ferrous metal surface. Once the vacuum is drawn, the distal portion 106*d* of the fingers 106 are pulled away from the ears 110*e* and partially rotated to the lowered position in which the magnets 107 surrounding the suction cup 108 are brought in proximity to and magnetically attached or attracted to the ferrous metal surface that the suction cup 108 is attached to. The steps may be reversed to remove the MASC mounting assembly 100 from the ferrous metal surface.

One of the aspects of the MASC mounting assembly 100 is the suction cup 108 with vacuum pump 112 in combination with securing assistance via the magnets 107. It is known that suction cups 108 lose vacuum over time and need to be reinstalled or pumped to restore the vacuum for an additional period of time. The MASC mounting assembly 100 can be used to mount an object to a ferrous metal surface with the magnets 107 providing secondary and/or additional support to the suction cup 108—whether the suction cup 108 is at full, partial or no vacuum. The MASC mounting assembly 100 has utility in many applications and markets that need additional support to suction-based mounting since suction can fail after some period of time.

It is to be understood that the MASC mounting assembly 100 may be used singly or in combination with one or more other MASC mounting assemblies 100 as discussed below.

Figure 5:
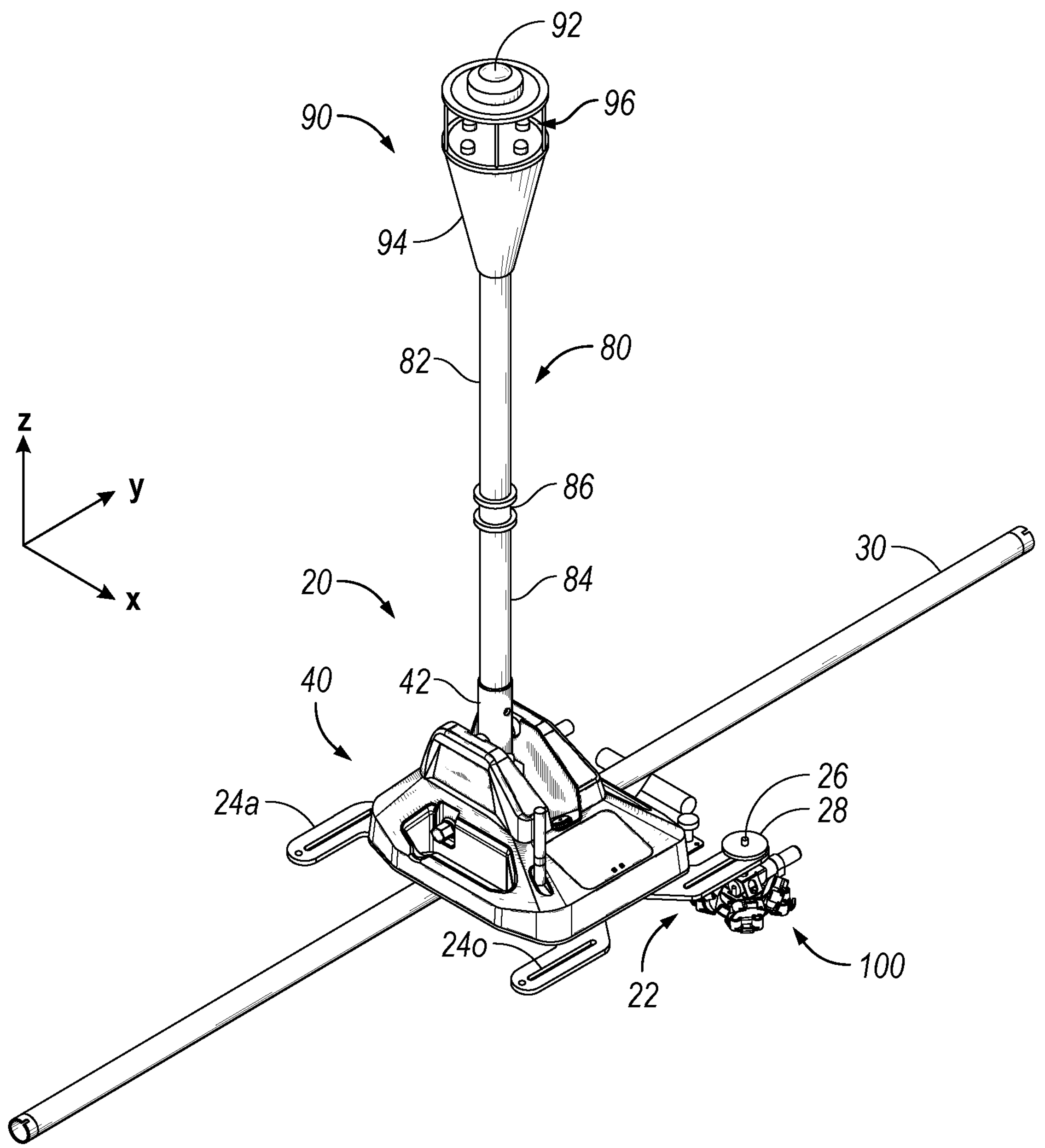
FIG. 5 is a perspective view of one type of releasable mounting system having an upright mast assembly.
Figure 17:
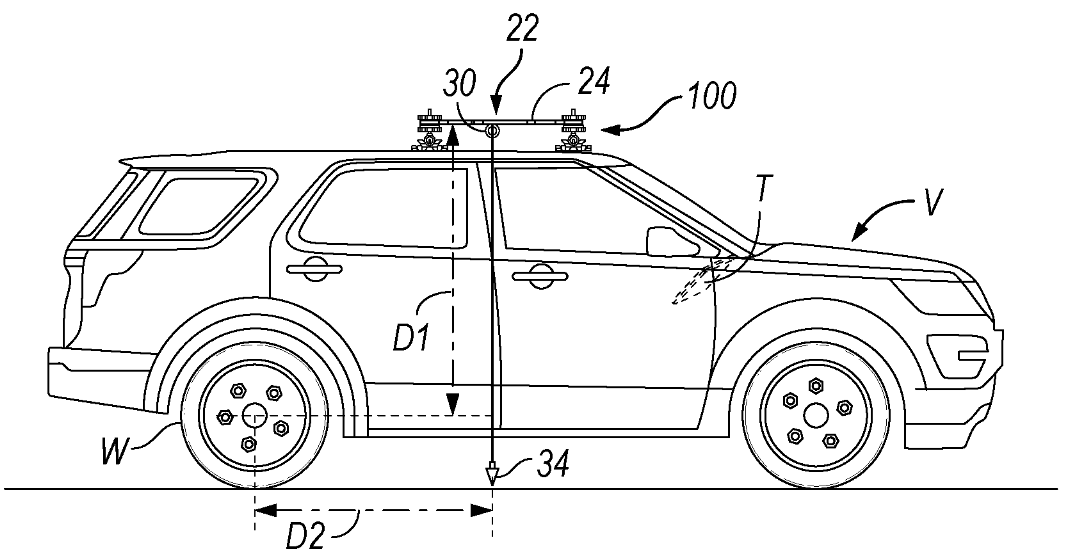
FIG. 17 is a side view of a vehicle with the base assembly being installed on the vehicle rooftop.
Figure 18:
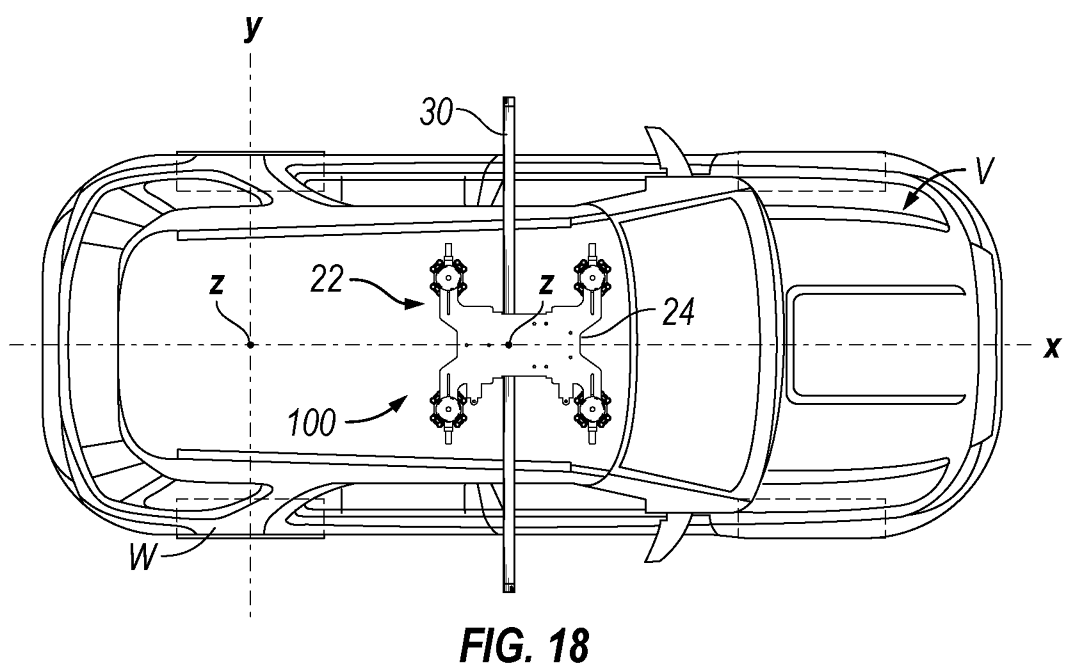
FIG. 18 is a top view of the vehicle of FIG. 17 showing the base assembly being installed on the vehicle rooftop.

FIG. 5 shows a perspective view of one type of releasable mounting system 20 incorporating a plurality of MASC mounting assemblies 100. The mounting system 20 is particularly suited for mounting devices to the rooftop of a vehicle V (FIGS. 17 and 18). For example, the mounting system 20 may be used with surveying equipment, GPS equipment, GNSS equipment, INS equipment, etc.

Additionally, it is to be understood that the illustrated embodiment is adapted to provide a releasable mounting system 20 that can be located with precision, is highly reliable, includes safety features for mounted equipment, and allows detachment and removal of an upper portion of the system 20 while leaving a lower portion in the precise location.

The illustrated embodiment described below is adapted for use with an advanced mobile leak detector (AMLD) system on a vehicle. One such AMLD system is disclosed in applicant's pending U.S. Patent Publication No. 2023/0107797. The AMLD system may be used to detect gas leaks and determine the locations of the gas leaks. Important to such AMLD systems is to accurately ascertain the vehicle's precise location, wind direction and speed as readings are taken from the moving vehicle during a leak detection survey. Two important sensors needed to accomplish this are a GNSS antenna 92 and an anemometer 96 as shown in FIG. 5.

In the illustrated embodiment shown in FIG. 5 and following, the releasable mounting system 20 comprises a base assembly 22 and a rooftop assembly 40. It is to be understood that the rooftop assembly 40 can be used as a stand-alone device and does not require the base assembly 22 to function.

Figure 9:
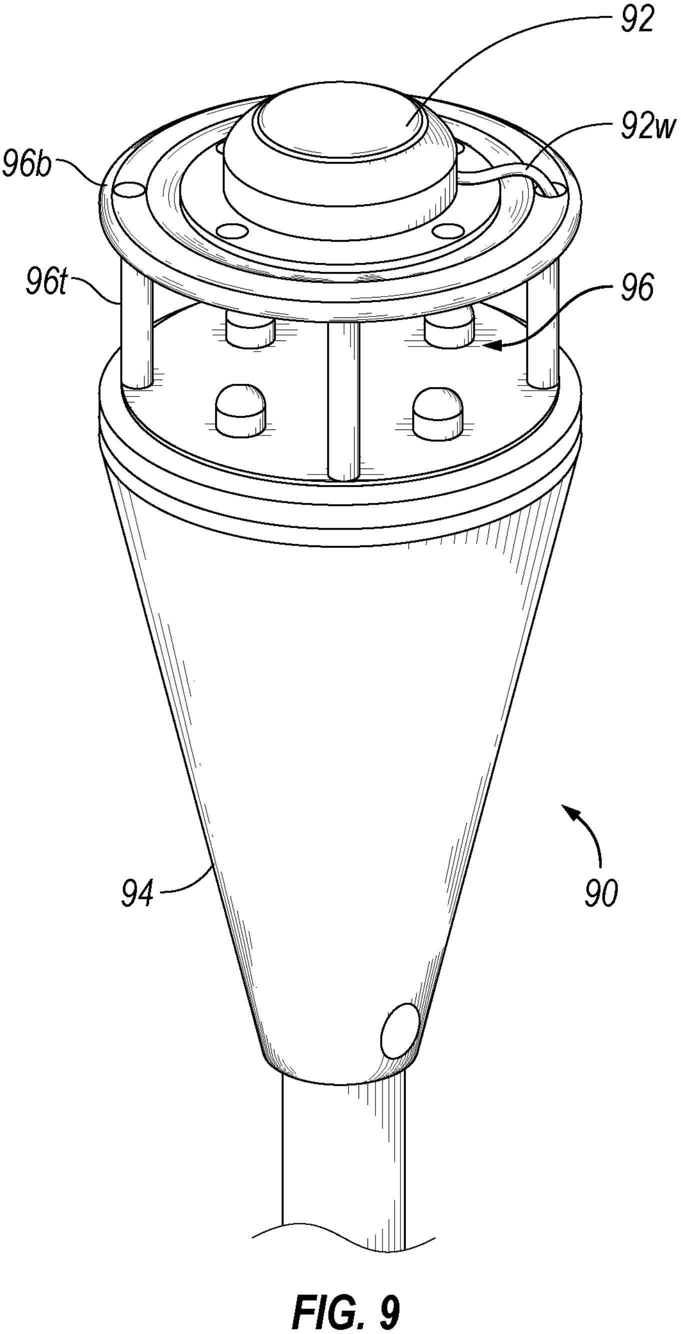
FIG. 9 is a perspective view of a housing assembly.
Figure 10:
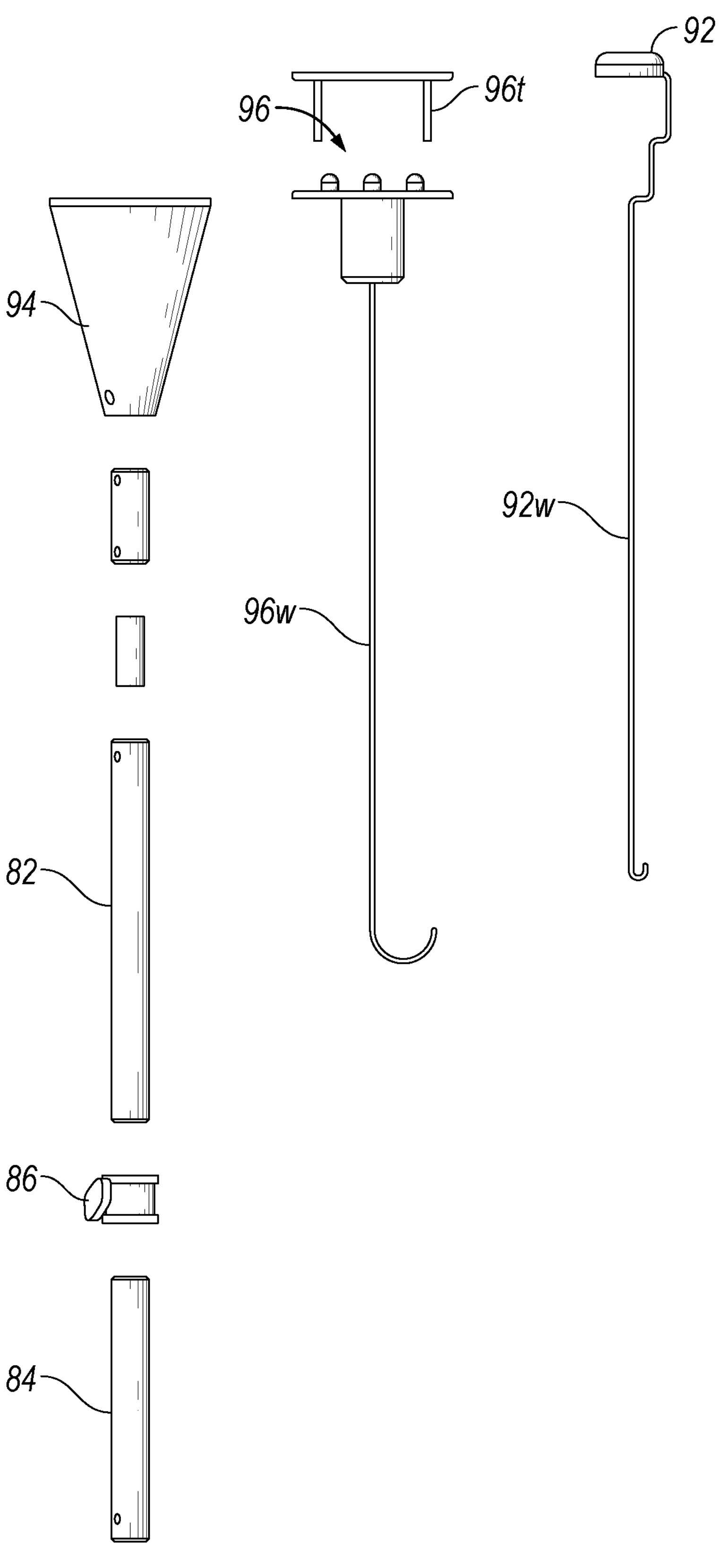
FIG. 10 is an exploded view of the housing assembly and mast assembly.
Figure 11:
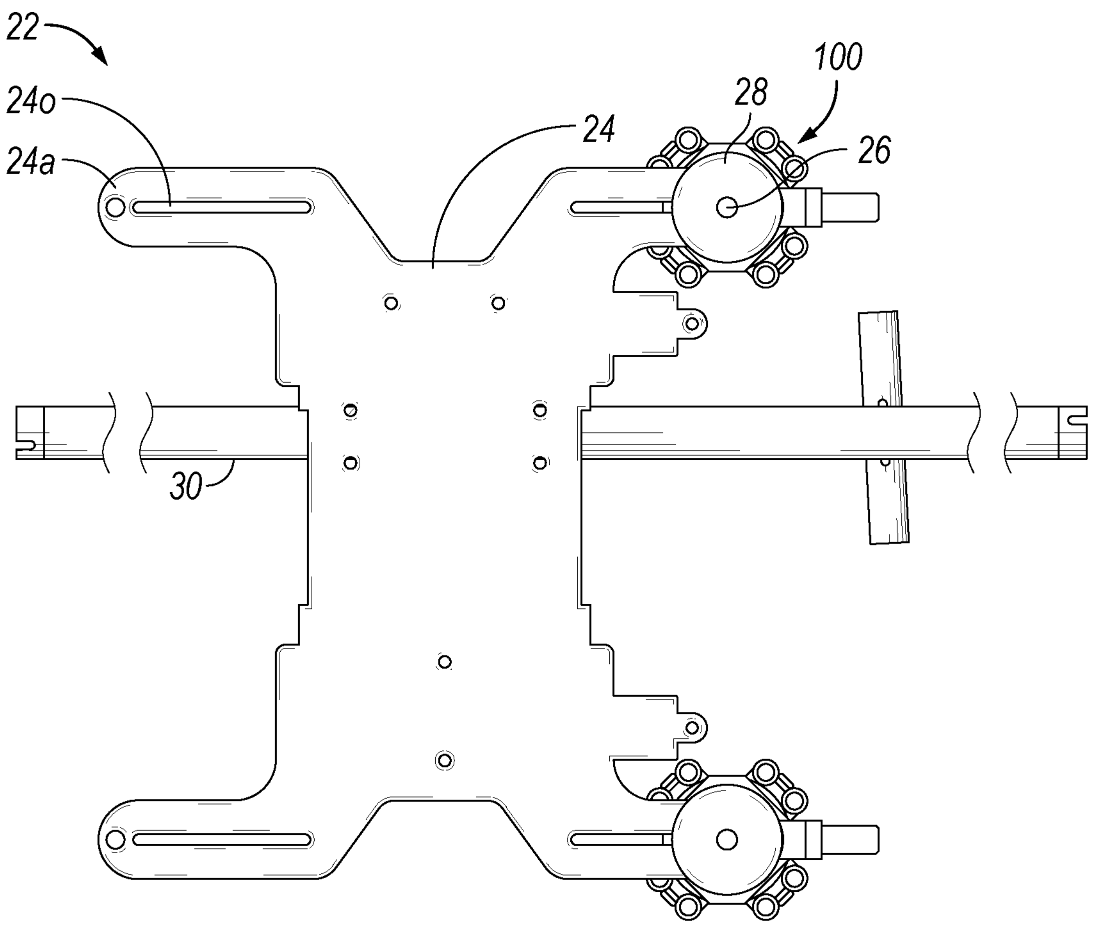
FIG. 11 is a top view of the base assembly.

The rooftop assembly 40 includes a mast assembly 80. The mast assembly 80 preferably comprises telescoping tubular members 82, 84 and a tubular lock 86. Mounted atop the mast assembly 80 is housing assembly 90 with a tapered housing 94, the GNSS antenna 92 and the anemometer 96. The GNSS antenna 92 is mounted on top of the anemometer 96, for example an anemometer bonnet 96*b* (FIG. 9), in such a way that the antenna 92 is a fixed distance in the x, y and z directions from the GNSS/INS receiver 74 (FIG. 19) preferably contained within the shell 44 (FIG. 12)), and preferably positioned below the mast assembly 80. Preferably, the GNSS antenna 92 is the highest object so that it receives a good GNSS signal and is a fixed distance from the GNSS/INS receiver 74 to allow for accurate GNSS calculations. As best seen in FIGS. 9 and 10, a wire 92*w* from the antenna 92 is routed through a tubular support 96*t* of the anemometer 96, through the tapered housing 94 and down through the mast assembly 80 where it exits. The anemometer 96 has a wire 96*w* which also extends down through the tapered housing 94 and the mast assembly 80 where it exits. The tapered housing 94 provides support and protection to the mounted anemometer 96 and GNSS antenna 92. The telescoping mast assembly 80 allows for height adjustment and facilitates storage and transport.

Commercially available anemometers are suitable for the present invention. For example, one such anemometer is the WindSonic 75 Ultrasonic Wind Sensor from Gill Instruments Limited, Hampshire UK. The WindSonic 75 Ultrasonic Wind Sensor has no moving parts and is a 2-axis ultrasonic wind sensor, providing wind speed and direction data via one serial or two analog outputs.

The base assembly 22 will now be described in detail with reference to FIGS. 5-8 and 11. The base assembly 22 includes a generally flat, planar base plate 24 having a plurality of arms 24*a*, with each arm 24*a* having an opening 24*o* therethrough. In the illustrated embodiment, the base plate 24 has four arms 24*a* and the openings 24*o* are elongated slots. A MASC mounting assembly 100 as described above and shown in detail in FIGS. 1-4 is attached to each arm 24*a* via a stud bolt 26 or fastener threadedly attached to the accessory mount 114*m* (FIG. 1). The stud bolt 26 extends through the elongated slot 24*o* and is secured to the arm 24*a* with one or more nuts or foot knobs 28. The elongated slots 24*o* allow the MASC mounting assemblies 100 to be positioned at any location along the length of slot 24*o*. This provides versatility to avoid vehicle rooftop obstructions and irregular surfaces and accommodates the placement on a variety of different vehicles. It is to be understood that two MASC mounting assemblies 100 have been omitted in FIGS. 5-8 and 11 for purposes of clarity.

It may be desirable to position a lower foot knob 28 on each stud bolt 26 below the slotted arm 24*a* for the purpose of levelling the base plate 24 upon placement on the vehicle roof and an upper foot knob 28 for securement of the base plate 24 to the MASC mounting assembly 100.

In a preferred embodiment, the rooftop assembly 40 is releasably detachable to the base plate 24 to allow for the removal of the rooftop assembly 40 without disturbing placement of the base assembly 22. This may be accomplished in several ways. A few examples include using threaded fasteners and/or a clamping mechanism to releasably secure the assemblies 40 and 22 together, or one of the assemblies 40 and 22 having a recessed portion and the other having a protruding portion that can be brought into contact along one longitudinal edge and then securing the other longitudinal edge in a similar manner or with a clamp or threaded fastener or some other means. Additionally, guide tabs could be used in combination with complementary engagement members, clamps and/or threaded fasteners to orient and secure the rooftop assembly 40 to the base assembly 22. It is to be understood that such a releasable connection is well known to a person of ordinary skill in the art.

Figure 15:
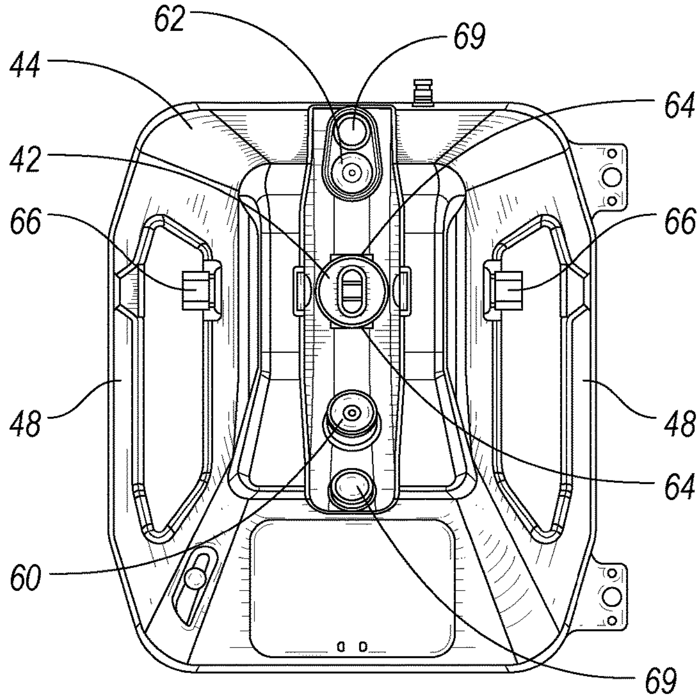
FIG. 15 is a top view of the portion of the rooftop assembly shown in FIG. 12.
Figure 16:
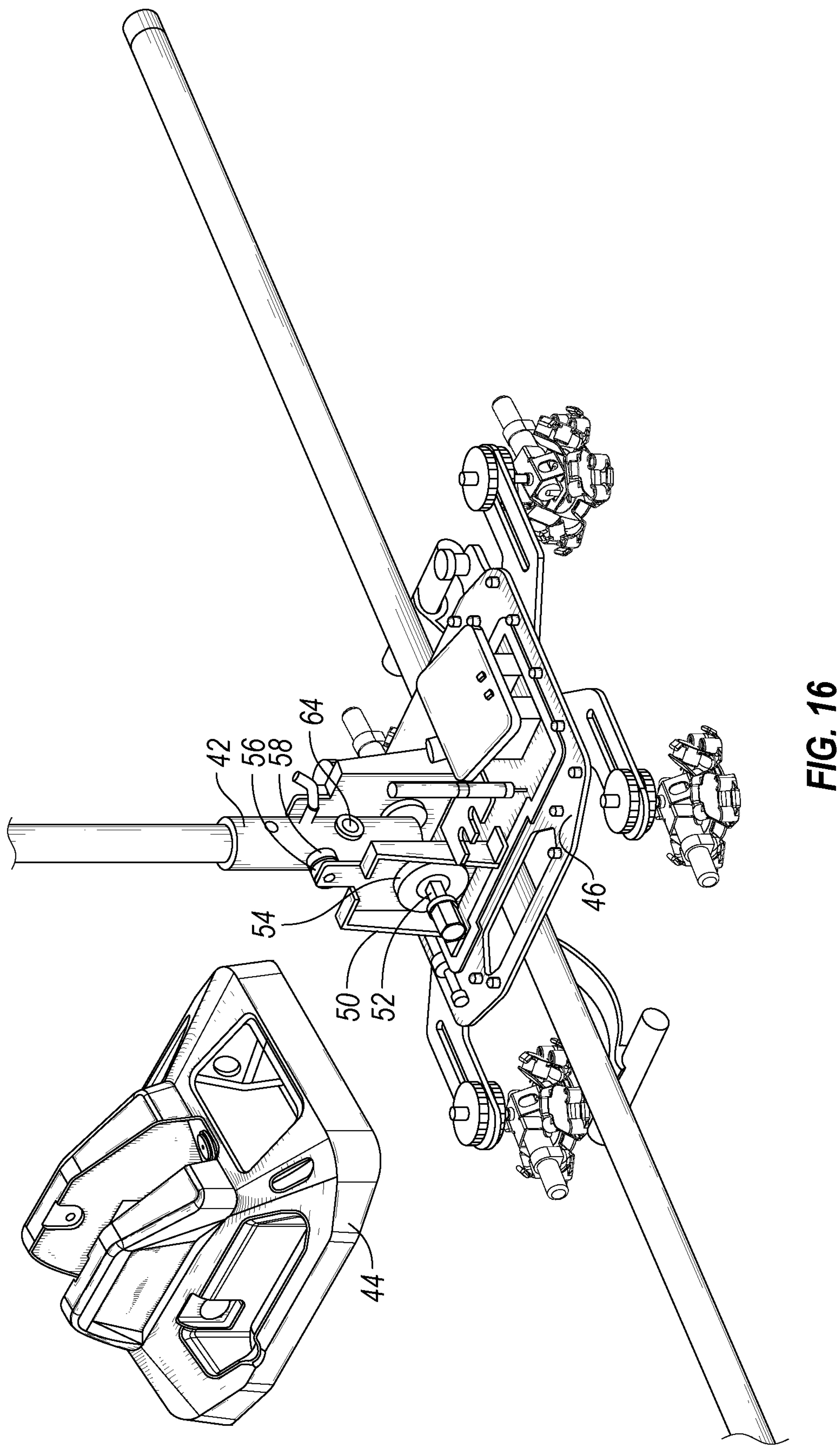
FIG. 16 is a perspective view of a portion of the rooftop assembly installed on the base assembly, with the shell being detached from the rooftop assembly.

FIGS. 12-16 show a preferred embodiment of the rooftop assembly 40 without the mast assembly 80. The rooftop assembly 40 includes a shell 44 which is attached to a shell plate 46 (FIG. 16). The shell 44 and shell plate 46 may include openings therethrough defining handles 48 on the left and right sides of the rooftop assembly 40 to facilitate handling of the rooftop assembly 40.

Referring to FIG. 16, the rooftop assembly 40 includes a pair of upright stanchions 50 mounted to the shell plate 46. The upright stanchions 50 are preferably aligned parallel to the longitudinal axis of the shell 44 and are spaced from one another by a distance permitting the lower portion of the mast support 42 to be positioned therebetween. Preferably, the lower portion of the mast support 42 includes a transverse opening therethrough. In a preferred embodiment, the transverse opening is a square opening for receiving a square shaft 52 therethrough. The square shaft 52 also extends through openings in the upright stanchions 50. The square shaft 52 is caused to rotate as the mast support 42 pivots forward and/or backward. The openings in the upright stanchions 50 allow the shaft 52 to rotate relative to the stanchions 50.

In a preferred embodiment, a dampener 54 may be mounted to each upright stanchion 50 and the square shaft 52 passes through the dampeners 54. The dampeners 54 help to dampen or break the fall of the pivotally-mounted mast assembly 80 in the event the mast assembly 80 strikes a tree limb or other obstruction.

With reference to FIG. 16, the upper portion of each upright stanchion 50 preferably includes a mounted magnet 56 and the mast support 42 includes a pair of mounted magnets 58 in opposing relationship to the stanchion magnets 56 when the mast support 42 is in an upright position. The magnet 56 and magnet 58 have an attraction force between them and are in close proximity to each other when the mast support 42 is in the vertical position. The attraction force between these two pair of magnets 56 and 58 provides an indexed position of the mast support 42 and mast assembly 80 which is preferably perpendicular to the longitudinal axis of the shell plate 46 (FIG. 16) and/or the base plate 24. Preferably, upon proper installation of the rooftop assembly 40 and when the vehicle V is on horizontal ground the base plate 24 is horizontal and the mast assembly 80 is vertical in the indexed position. It is to be understood that the indexed position does not "fix" the mast assembly 80 although maintains the mast assembly 80 in the proper upright vertical position unless the mast assembly 80 strikes an object at which time the force on the mast assembly 80 may overcome the attraction force of the magnets 56 and 58 and cause the mast assembly 80 to pivot and fall forward or backward. It is to be understood that other means may be used to bias the mast assembly 80 in the indexed upright position, as for example mechanical means, while still allowing the mast assembly 80 to pivot forwardly or rearwardly.

In a preferred embodiment, the rooftop assembly 40 may have a front magnet 60 and a rear magnet 62 placed forward and rearward of the mast support 42 on sloping surfaces of the shell 44 as shown in FIG. 15. The mast support 42 includes a pair of magnets 64, one facing forward and one facing rearward. The forward-facing magnet 64 is positioned such that it would be in opposing relationship to the front magnet 60 if the mast support 42 pivots forwardly and the rearward-facing magnet 64 is positioned such that it would be in opposing relationship to the rear magnet 62 if the mast support 42 pivots rearwardly. A repulsion force is created when the forward-facing magnet 64 is in proximity to the front magnet 60. Similarly, a repulsion force is created when the rearward-facing magnet 64 is in proximity to the rear magnet 62. The repulsion forces serve to further dampen or break the fall of the mast assembly 80 upon striking an object.

It is to be understood that the dampeners 54 and the magnetic repulsion forces help to prevent damage to the mast assembly 80, anemometer 96, antenna 92 and the vehicle V. Further, the pivotally-mounted anemometer mast 80 is vertically positioned with magnets 56, 58 so that in the event an object hits the anemometer 96 and/or the mast assembly 80, the mast assembly 80 can pivot and fall towards the vehicle rooftop preventing damage.

In an embodiment, the square shaft 52 may have a lug nut 66, preferably hexagonal in shape, on one or both ends to facilitate attaching a tool, for example a socket wrench, to erect the mast assembly 80 when it is not in the indexed position, as for example when the mast assembly 80 is in a lowered (i.e., substantially horizontal) position when not surveying. Additionally, the wrench may be used to position the mast assembly 80 in the vertical position if it is leaning forward or rearward. Additionally, the socket wrench may be used to rotate the shaft 52 to lower the mast assembly 80 for storage or prior to removal of the rooftop assembly 40 from the base assembly 22. As stated above, preferably the mast assembly 80 also allows for height adjustment and facilitates storage and transport. The length of the telescoping mast assembly 80 may be shortened by turning or loosening the tubular lock 86 (FIG. 7) and allowing one of the tubular members 82, 84 to slide within the other. Once in the shortened length the tubular lock 86 may be tightened. The short length of the mast assembly 80 may be desirable when not surveying and may also be desirable when the mast assembly 80 is in the lowered position. The mast assembly 80 is returned to full length when surveying.

Figure 12:
FIG. 12 is perspective view of a portion of the rooftop assembly.
Figure 12:
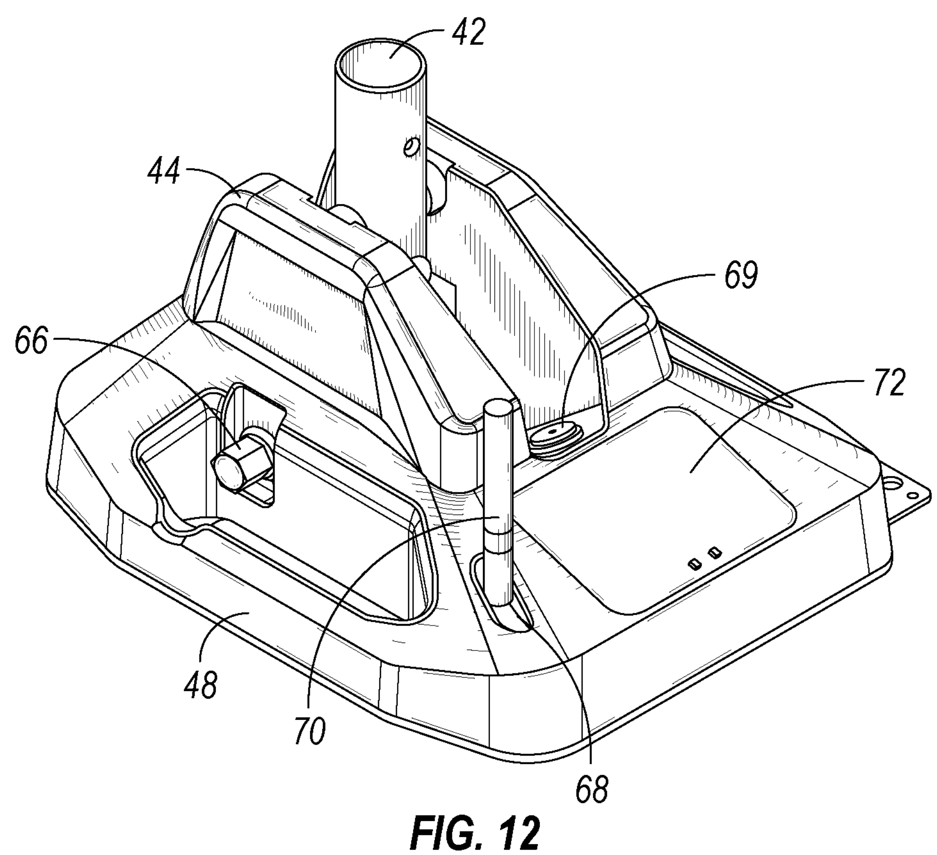
Figure 13:
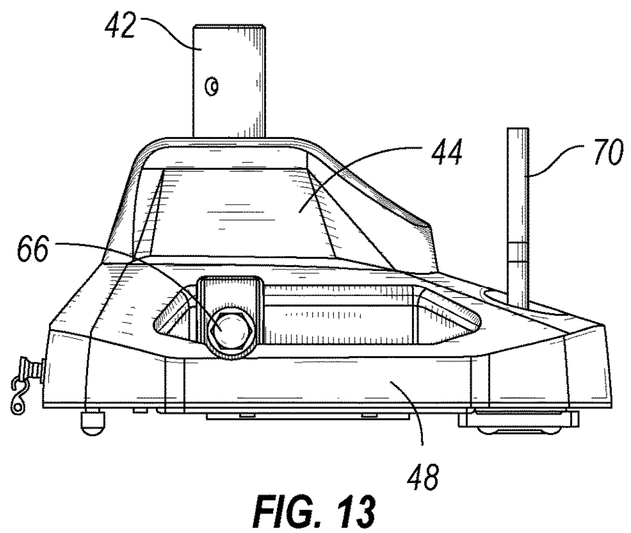
FIG. 13 is a side view of the portion of the rooftop assembly shown in FIG. 12.
Figure 14:
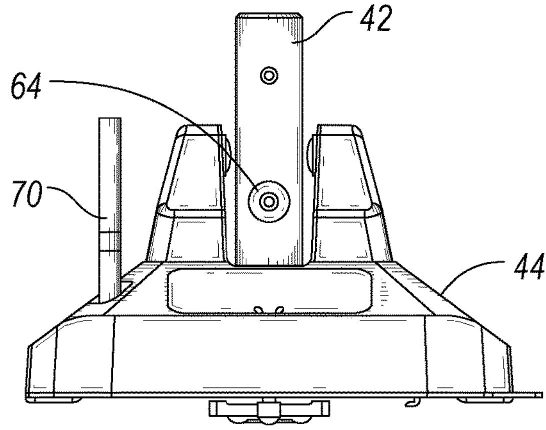
FIG. 14 is a front view of the portion of the rooftop assembly shown in FIG. 12.
Figure 19:
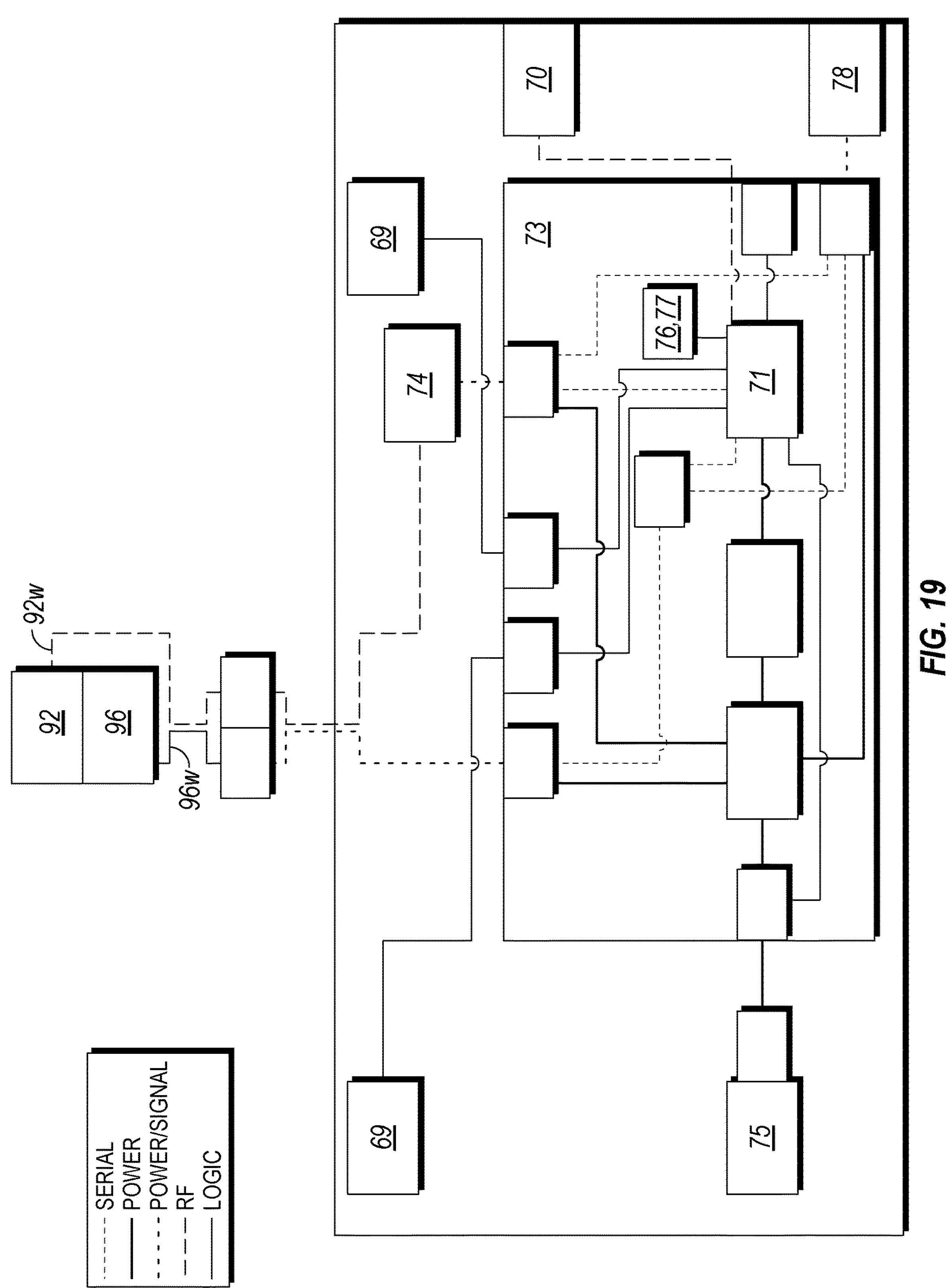
FIG. 19 is an electrical block diagram for the rooftop assembly.

With reference to FIGS. 12 and 15, the shell 44 may have one or more Hall effect sensors 69 to provide information with respect to the position of the mast assembly 80. Hall effect sensors are well known in the art. A Hall effect sensor, sometimes simply referred to as Hall sensor, is a type of sensor which detects the presence and magnitude of a magnetic field using the Hall effect. The output voltage of a Hall sensor is directly proportional to the strength of the field. With reference to FIG. 15, one Hall effect sensor 69 is positioned forward of the mast assembly 80 and one is positioned rearward of the mast assembly 80. The Hall effect sensors 69 are utilized to detect the position of the mast assembly 69. With reference to FIG. 19, signals from the front and rear Hall effect sensors 69 are provided to a microcontroller 71, preferably a Bluetooth microcontroller, mounted on a printed circuit board (PCB) 73 contained within the rooftop assembly 40. Power is provided to the microcontroller 71, anemometer 96, and the GNSS/INS receiver 74 via a battery 75 housed within an internal compartment with door 72 (FIG. 12) in the shell 44. As shown in FIG. 12, the shell 44 preferably has an antenna bulkhead 68 for placement/positioning of a Bluetooth antenna 70.

Referring to FIG. 19, a pressure sensor 76 and temperature sensor 77 are provided in the rooftop assembly 40 for detecting ambient pressure and temperature, respectively. The pressure and temperature sensors 76, 77 provide data to the microcontroller 71. The data from these sensors 76, 77 may be used to provide corrections to data affected by the ambient conditions.

In a preferred embodiment, all the data gathered and obtained from the rooftop assembly 40 is transmitted wirelessly from the rooftop assembly 40 to a tablet or computer T within the vehicle V (FIG. 17). The preferred embodiment streams all the data from the GPS antenna 92, anemometer 96, GNSS/INS receiver 74, Hall effect sensor(s) 69, pressure sensor 76, and temperature sensor 77 on a single channel using the single Bluetooth antenna 70. As shown in FIG. 19, the rooftop assembly 40 may also have an external connector 78 to provide a wired connection to the tablet T within the vehicle V.

In a preferred embodiment as shown in FIGS. 5-8, precise placement including location and orientation of the releasable mounting system 20 on or above the rooftop is desirable. In a preferred embodiment, the location of the GNSS/INS receiver 74 (FIG. 19) is at a fixed distance from the GNSS antenna 92 and the vehicle axis of rotation. The vehicle axis of rotation is typically the center of the vehicle rear axle.

The releasable rooftop mounting system 20 is fixed to the vehicle V in such a way that the 3 axis offset of the GNSS/INS receiver 74 from the GNSS antenna 92 is fixed and the 3 axis offset of INS system (Inertial Measurement Unit IMU embedded within the GNSS/INS receiver 74) with respect to vehicle center of axis of rotation is fixed. Various techniques may be used to properly position and place the base assembly 22 on the rooftop of the vehicle V.

One technique utilizes an alignment pole 30 that is temporarily secured to the base assembly 22. This technique may be desired when the vehicle V does not have roof rails or factory-installed roof rails.

Figure 6:
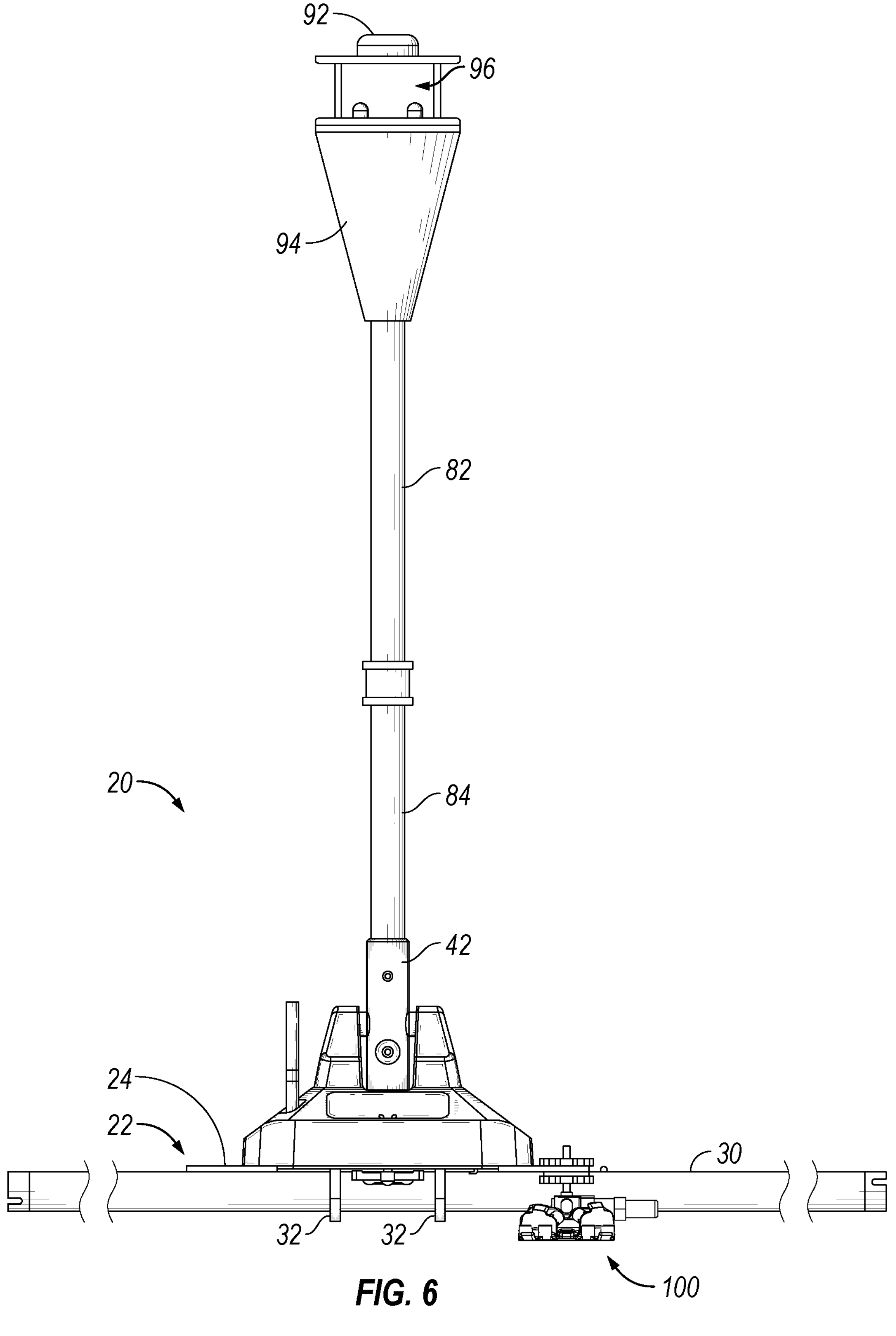
FIG. 6 is a front view of the releasable mounting system shown in FIG. 5.
Figure 7:
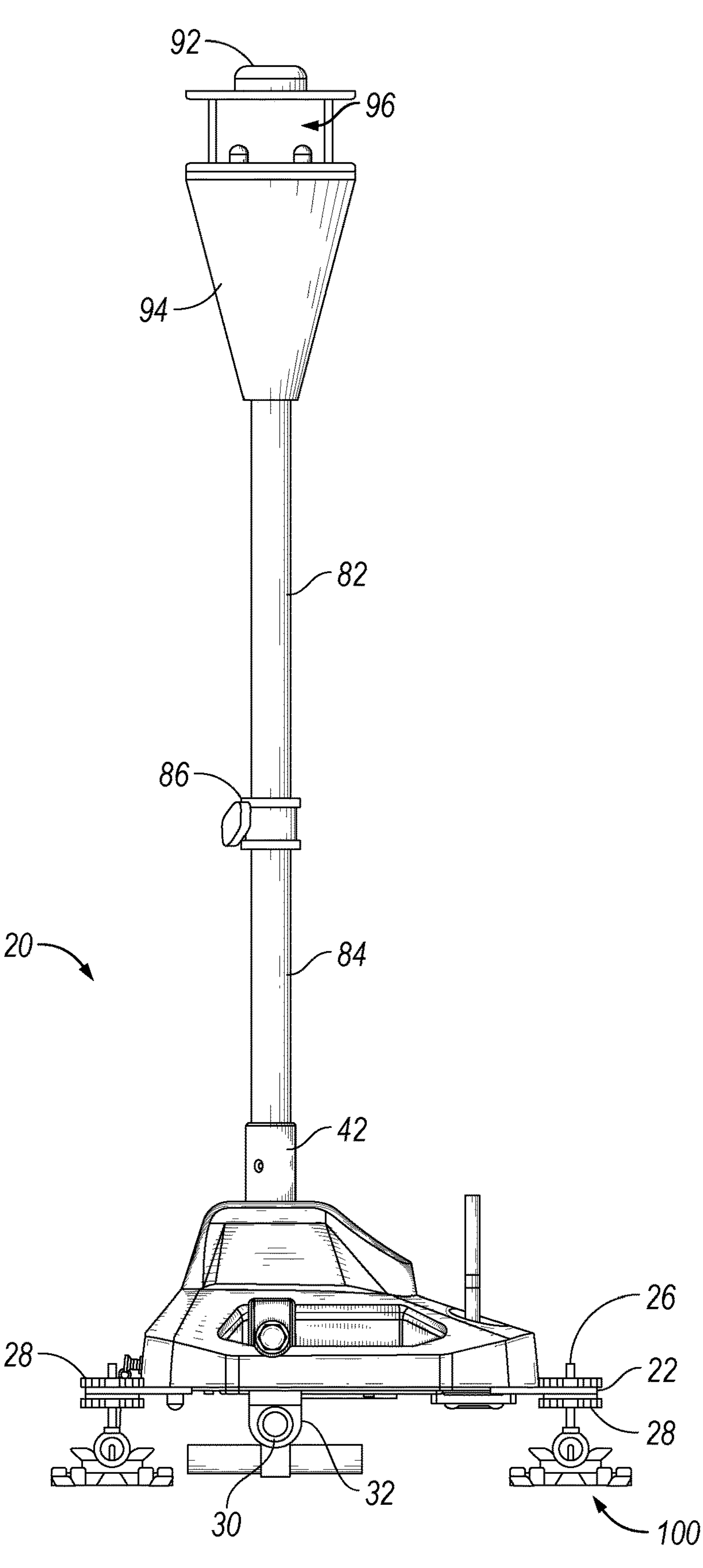
FIG. 7 is a side view of the releasable mounting system shown in FIG. 5.

Prior to mounting the base assembly 22 to the vehicle rooftop, the alignment pole 30 may be connected to the base plate 24 with a least one alignment flange 32 as shown in FIGS. 6 and 7. The alignment pole 30 has a longitudinal axis that is transverse to a longitudinal axis of the base assembly 22.

In a preferred embodiment, the base assembly 22 may be installed onto the vehicle rooftop either with or without the rooftop assembly 40 attached to the base assembly 22. It may be desirable to install and position the base assembly 22 onto the rooftop without the added weight and height of the rooftop assembly 40. As discussed above, various mechanisms may be used to releasably secure the rooftop assembly 40 to the base assembly 22.

In a preferred embodiment, the rooftop assembly 40 will mount on the base assembly 22 in a predetermined place and orientation with respect to the base assembly 22. Thus, once the base assembly 22 is positioned, oriented and secured to the vehicle rooftop, the attachment of the rooftop assembly 40 to the installed base assembly 22 will result in the proper placement of the rooftop assembly 40, including the mast assembly 80 with the anemometer 96 and antenna 92.

Figure 8:
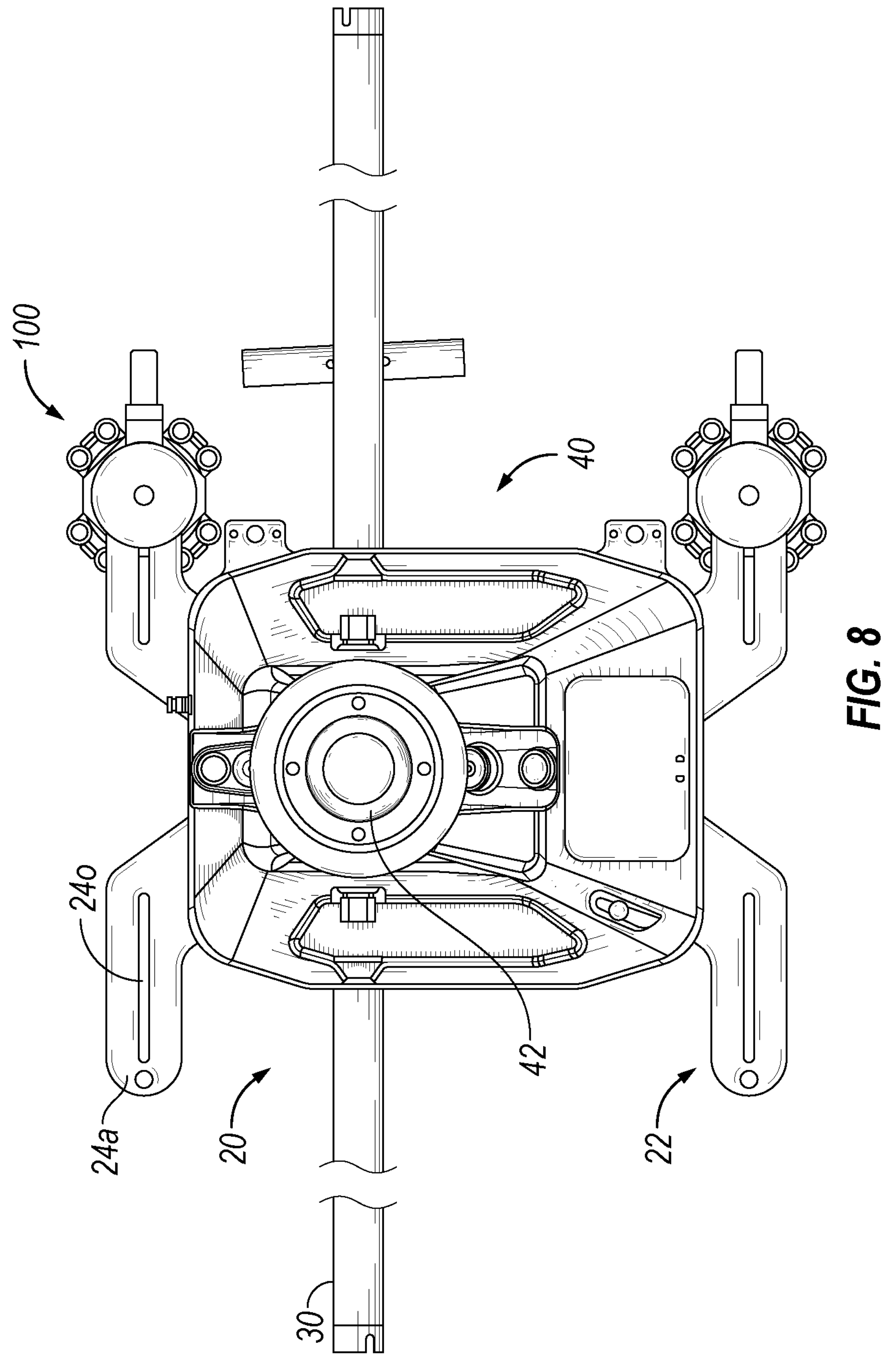
FIG. 8 is a top view of the releasable mounting system shown in FIG. 5.

When the rooftop assembly 40 is positioned on the base assembly 22, the mast support 42 has a vertical axis that preferably intersects the longitudinal axis of the alignment pole 30 as shown in FIGS. 7 and 8 and preferably intersects a longitudinal centerline of the base plate 24. Additionally, the mast support 42 is preferably located in the center of the width of the shell 44.

As stated above, it may be important that the location of the GNSS/INS receiver 74 is at a fixed distance from the GNSS antenna 92 and the vehicle axis of rotation, which is typically the center of the vehicle rear axle. Proper positioning and placement of the system 20 relative to the center of the rear axle and on the longitudinal axis of the vehicle V on a vehicle rooftop can be accomplished using the alignment pole 30 secured to the base plate 24. Preferably, the length of the alignment pole 30 is at least as long or longer than the width of the vehicle V.

It is to be understood that FIGS. 17 and 18 show the base assembly 22 being positioned onto the vehicle V at a forward location on the rooftop. It has been found that the detected readings from the anemometer 96 and antenna 92 are improved when the rooftop assembly 40 is positioned nearer the front of the rooftop. Preferably, the vehicle V is parked on level ground during the installation of the base assembly 22. Referring to FIGS. 17 and 18, with the alignment pole 30 mounted transversely to the longitudinal axis of the base plate 24 and/or shell 44 and with the middle of the length of the pole 30 positioned vertically below the vertical axis of the mast support 42, a plumb bob 34 attached near each outer end of the alignment pole 30 can be used to properly position the rooftop assembly 40 with the mast support 42. Positioning the base assembly 22 on the longitudinal axis of the vehicle V can be accomplished several ways. For example, the alignment pole 30 can include incremental markings indicating the distance from the center of the pole 30 along the length of the pole 30 in both directions. The plumb bobs 34 may be suspended at a height slightly above the ground via a string looped around the ends of the pole 30. The string loops may be slid on the pole 30 until the string just makes contact with the side of the vehicle V. When the distance of the string loops on the pole 30 is the same on both sides when the string just makes contact with the vehicle V and when the string contacts each side of the vehicle V at the same place in the longitudinal direction, then the base assembly 22 is properly positioned on and aligned with the longitudinal axis of the vehicle. It is to be understood that other techniques may be used to center and align the base assembly 22 on the longitudinal axis (i.e., the x-axis) of the vehicle V.

The MASC mounting assemblies 100 may now be activated by forming a suction between the vehicle roof surface and the suction cups 108. Downward pressure may be applied to the suction cups 108 for initial engagement with the vehicle roof surface. The suction pumps 112 may be used to achieve the seal. The distal portion **106*d* of the fingers 106 may be pulled away from the ears 110*e*** and brought to the lowered position in contact with the ferrous surface of the vehicle V to provide magnetic assist.

It is to be understood that the installation of the base assembly 22 may be secured to the vehicle rooftop using the suction cups 108 in instances where portions of the rooftop are non-ferrous, glass, etc. The releasable mounting system 20 will work reliably with one or more of the suction cups 108 attached to a non-ferrous surface. The magnets 107 are provided to assist with the securement of the releasable mounting system 20 on ferrous surfaces.

The lower foot knob 28 on each stud bolt 26 of the MASC mounting assembly 100 may be adjusted to achieve a level base assembly 22 and the upper foot knob 28 is tightened to provide securement of the base plate 24. Preferably, the levelness of the base assembly 22 is verified in two directions: front-to-back and side-to-side. Following positioning and securement of the base assembly 22 on the vehicle roof top, the rooftop assembly 40 may be installed onto the base assembly 22 as described above. Additionally, it is to be understood that the rooftop assembly 40 may be removed from the base assembly 22, leaving the base assembly 22 in place on the rooftop. Also, the rooftop assembly 40 can be repeatably and precisely mounted to the base assembly 22.

In a preferred embodiment, accurate measurement of the position of the GNSS/INS receiver 74 from the vehicle center of axle is needed to determine accurate latitude and longitude calculations using the inertial navigation system in combination with the GNSS signal. This is especially helpful when the satellite GPS signal is degraded or absent and thereby helps increase or largely maintain the positional accuracy of the vehicle V in most situations. These measurements are recorded to the program that makes the location calculations. With reference to FIG. 17, a vertical distance D1 from the top of the pole 30 to the center of the wheel W may be determined by measuring from top of the pole 30 to the ground (1A); measuring from center of rear wheel W to the ground (1B); and subtracting 1B from 1A. The horizontal distance D2 between the center of the rear wheel W and the plumb bob 34 can be measured along the ground or horizontally above the ground from the string to the center of the rear wheel W.

Following the determination of distances D1 and D2, the plumb bobs 34 and string may be removed and the alignment pole 30 may be removed from the base assembly 22.

Tethers may be connected to the base assembly 22 and run into the vehicle V to provide additional safety.

A second preferred embodiment of the rooftop assembly 240, similar in many respects to the first embodiment previously described, is shown in FIGS. 20-23. The second preferred embodiment is particularly well suited for vehicles with roof rails R on the roof of the vehicle V. Preferably, there are a pair of roof rails R mounted to the roof of the vehicle V parallel with and evenly spaced from a longitudinal axis of the vehicle V. The second preferred embodiment of the rooftop assembly 240 does not require the alignment pole 30 and the alignment flange 32.

Figure 20:
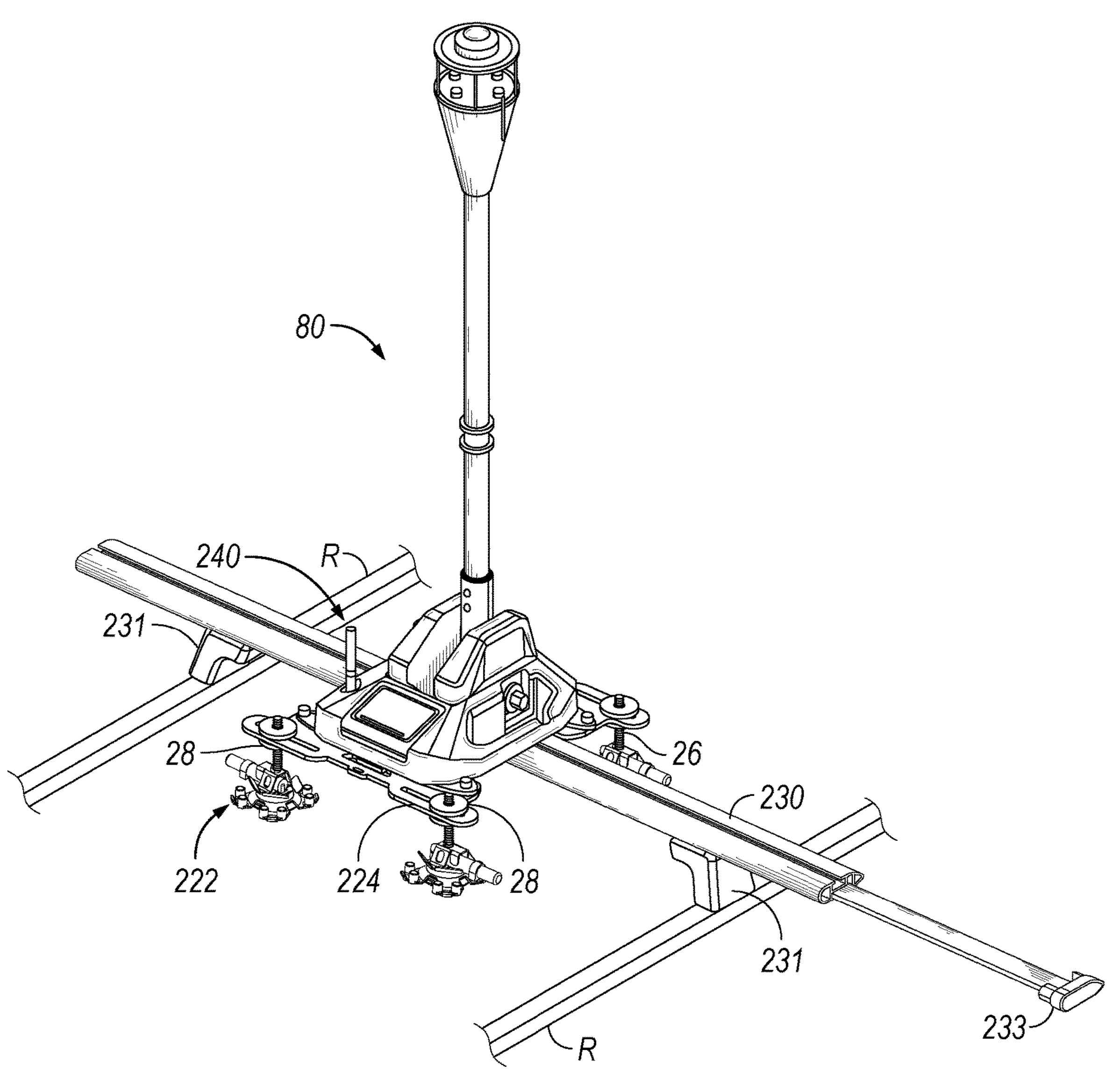
FIG. 20 is a perspective view of a second type of releasable mounting system having an upright mast assembly.
Figure 21:
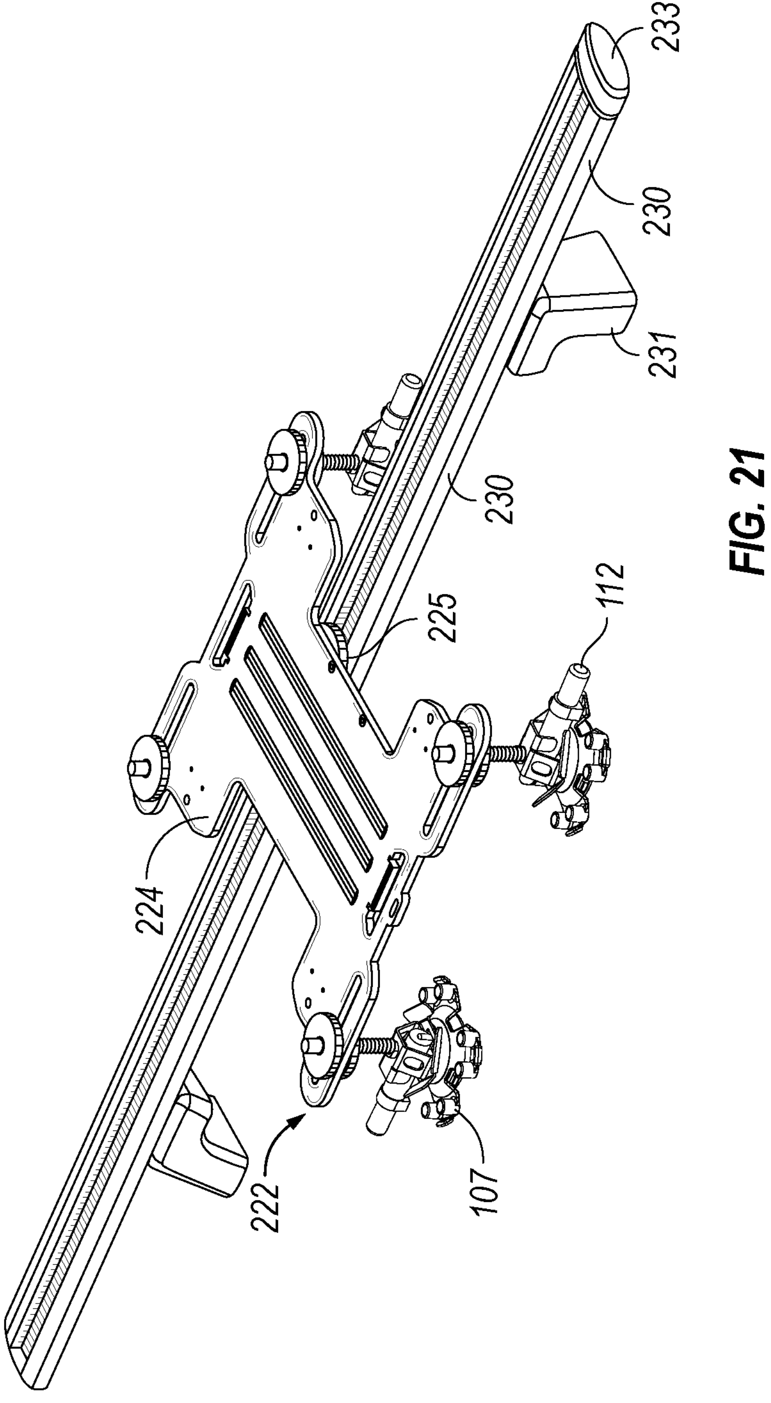
FIG. 21 is a perspective view of the releasable mounting system of FIG. 20 showing the base assembly mounted to a crossbar.

Referring to FIGS. 20 and 21, the rooftop assembly 240 is releasably mounted to a base assembly 222 having a base plate 224 attached to a crossbar 230. The crossbar 230 is connected to a pair of support towers 231 which are adapted to be secured to the pair of vehicle roof rails R. Preferably, the crossbar 230 includes an upper T-slot 230*t* having a rubber infill 230*i* extending along the length of the crossbar 230 and an endcap 233 removably enclosing an end of the crossbar 230. In a preferred embodiment, the endcap 233 is attached to an extension member 235 which is slidingly received within a passageway within the crossbar 230.

The installation procedure will now be described. The vehicle V should be parked on level ground. The support towers 231 are attached to the lower side of the crossbar 230 near each end and the towers 231 are secured to the vehicle roof rails R. It is to be understood that there are various means for securing the towers 231 to the crossbar 230 and to the roof rails R which are well known in the art. The crossbar 230 and the towers 231 are positioned toward the front of the vehicle V, preferably as far to the front of the vehicle V as possible. The crossbar 230 should be transverse to the longitudinal axis of the vehicle V. One technique to ensure transverse positioning is to measure from one tower 231 to a point on the vehicle, for example a line in the roof rail to which the tower is attached, and match that measurement between the other tower and the common line on the other side of the vehicle V. Additionally, the crossbar 230 is preferably centered to the vehicle width. Another way of stating this is that the midpoint of the length of the crossbar 230 is on the longitudinal centerline of the vehicle V.

Figure 22:
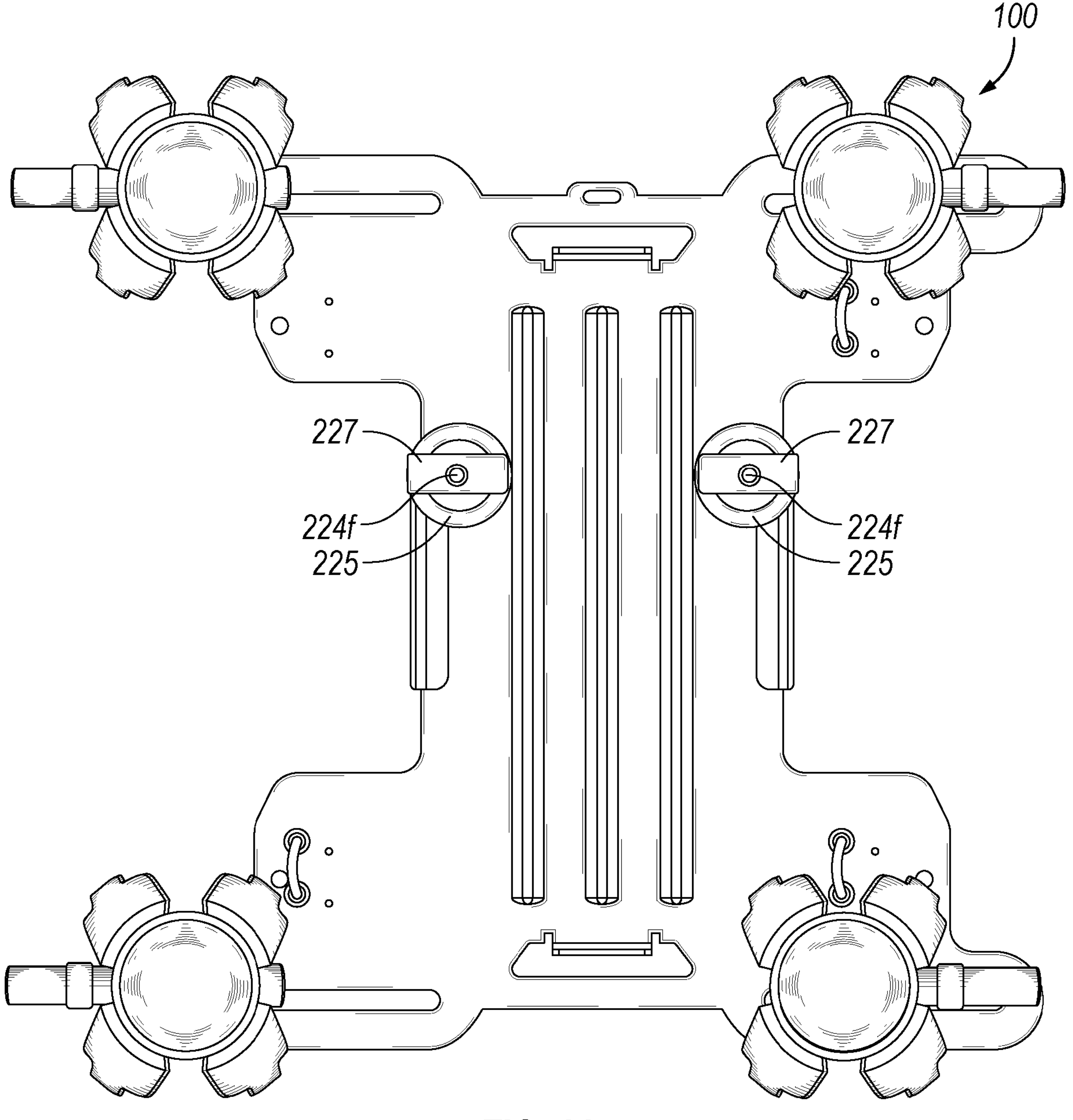
FIG. 22 is a bottom view of the base assembly of FIG. 21.
Figure 23:
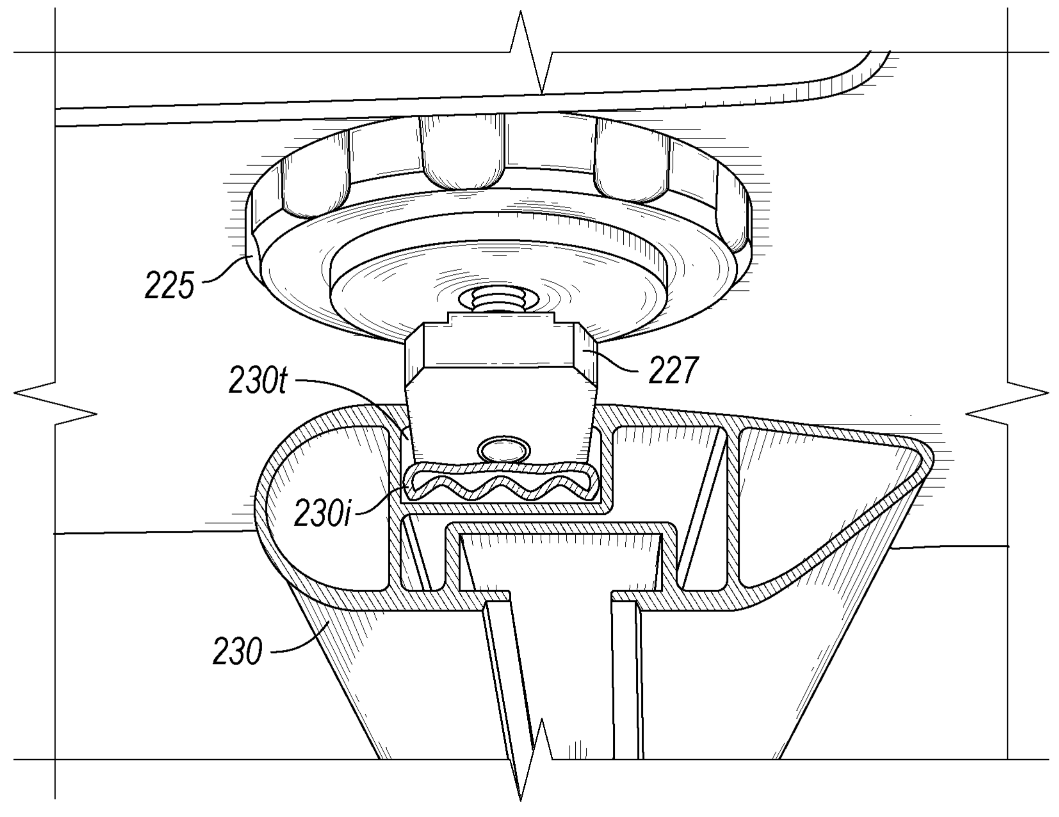
FIG. 23 is an end view of the crossbar showing attachment of the base assembly.

The endcap 233 is pulled from the crossbar to expose the T-slot 230*t* and rubber infill 230*i*. A plurality of MASC mounting assemblies 100, preferably four, are mounted to the base plate 224 as described in the first embodiment. Referring to FIG. 22, a pair of threaded fasteners 224*f* extend from the bottom of the base plate 224. The pair of threaded fasteners 224*f* are on a line that is transverse to the longitudinal axis of the base plate 224. As shown in FIGS. 22 and 23, a T-nut knob 225 and a T-nut 227 are threaded onto each fastener 224*f*. The T-nut knob 225 is positioned above the T-nut 227 and the T-nut knob 225 is allowed to travel up and down the threaded fastener 224*f* between the base plate 224 and the T-nut 227.

The two T-nuts 227 on the underside of the base plate 224 are inserted into the T-slot 230*t* of the crossbar 230, with the T-nuts 227 compressing the rubber infill 230*i* upon insertion into the T-slot 230*t* as shown in FIG. 23. The base plate 224 is pushed toward the center of the crossbar 230 with the T-nuts 227 sliding within the T-slot 230*t*. When the base plate 224 is centered to the vehicle width, the T-nut knobs 225 are tightened securely onto the crossbar 230.

Downward pressure is applied to the four MASC mounting assemblies 100 to engage the suction cups 108 onto the vehicle roof surface. The suction pumps 112 may be used to achieve the seal. The magnets 107 are deployed to the lowered position in contact with the ferrous rooftop surface of the vehicle V to provide magnetic assist. However, the magnets 107 will not be lowered if not on a ferrous rooftop.

The lower foot knob 28 on each stud bolt 26 of each MASC mounting assembly 100 is adjusted to achieve a level base assembly 222 and the upper foot knob 28 is tightened to sandwich the base plate 224 and provide securement of the base plate 24. Preferably, the levelness of the base assembly 222 is verified in two directions: front-to-back and side-to-side.

Following positioning and securement of the base assembly 222 on the vehicle roof top, the rooftop assembly 240 and mast assembly 80 may be installed onto the base assembly 222 as described above for the first embodiment.

As discussed previously, measurements from the GPS antenna 92 to the vehicle center axle are needed to improve location accuracy. Following are steps used to determine the location of the rooftop assembly upon installation on the vehicle rooftop. The endcap 233 attached to the extension member 235 is pulled out so it extends beyond the side of the vehicle V. A plumb bob 34 is suspended, preferably slightly above the ground, via a string attached to the endcap 233 or extension member 235. The vertical distance from the top of the crossbar 230 to the center of the rear wheel W is determined similar to that described previously with reference to FIGS. 17 and 18. The horizontal distance between the center of the rear wheel and the plumb bob 34 is also determined similar to that described previously. Although not required, preferably the crossbar 230 is positioned vertically below the mast assembly 80. These measurements are inputted into a program on the tablet or computer T in the vehicle V. Once the measurements are determined, the plumb bob 34 and string are removed and the endcap 233 and extension member 235 are slid back into the crossbar 230.

It is to be further understood that this invention has numerous applications that may not require one or more of the numerous features described below and such embodiments remain within the scope of the present invention.

Nomenclature roof rails R
computer T
vehicle V
rear wheels W
releasable mounting system 20
base assembly 22
base plate 24
arms 24*a*
opening 24*o*
stud bolt 26
foot knob 28
alignment pole 30
alignment flange 32
plumb bob 34
rooftop assembly 40
mast support 42
shell 44
shell plate 46
handles 48
upright stanchions 50
square shaft 52
dampener 54
magnet 56
magnet 58
front magnet 60
rear magnet 62
magnets 64
lug nut 66
antenna bulkhead 68
Hall effect sensor 69
Bluetooth antenna 70
microcontroller 71
internal compartment with door 72
printed circuit board (PCB) 73
GNSS/INS receiver 74
battery 75
pressure sensor 76 temperature sensor 77
external connector 78
mast assembly 80
tubular member 82
tubular member 84
tubular lock 86
housing assembly 90
GNSS antenna 92
wire 92*w*
tapered housing 94
anemometer 96
anemometer bonnet 96*b*
tubular support 96*t*
wire 96*w*
magnetic-assisted suction cup (MASC) mounting assembly 100
retaining assembly 102
frustoconical portion 104
planer upper surface 104*s*
fingers 106
distal portion 106*d*
hinge 106*h*
opening 106*o*
proximal portion 106*p*
receptacles 106*r*
planer lower surface 106*s*
tab 106*t*
magnet 107
suction cup 108
lift tabs 108*t*
storage plate 110
base 110*b*
ears 110*e*
suction pump 112
pump rod 112*r*
tubular insert 112*t*
pump bracket 114
fasteners 114*f*
accessory mount 114*m*
base assembly 222
base plate 224
threaded fasteners 224*f*
T-nut knob 225
T-nut 227
crossbar 230
rubber infill 230*i*
T-slot 230*t*
support towers 231
endcap 233
extension member 235
rooftop assembly 240

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A releasable mounting system for semi-permanently attaching to a surface of a vehicle, comprising:
a rooftop assembly (40) comprising:
a mast assembly (80) comprising a mast support (42), a tubular member (82, 84), and an upper housing assembly (90) comprising a Global Navigation Satellite System (GNSS) antenna (92) and an anemometer (96), the GNSS antenna (92) mounted above the anemometer (96) at the highest point of the mast assembly (80);
a shell (44) having a pair of upright stanchions (50) aligned parallel to a longitudinal axis of the shell (44), the pair of upright stanchions (50) spaced from one another by a distance allowing the mast support (42) to be positioned therebetween and pivotally mounted to the pair of upright stanchions (50),
wherein the mast assembly (80) is biased in an upright position and allowed to pivot in forward and rearward directions from the upright position, and
at least one sensor (69) for detecting the orientation of the mast assembly (80).

2. The releasable mounting system of claim 1, wherein the at least one sensor (69) is a Hall effect sensor.

3. The releasable mounting system of claim 1, wherein the at least one sensor (69) comprises first and second Hall effect sensors, the first Hall effect sensor positioned at a location forward of the mast support (42) and the second Hall effect sensor positioned at a location rearward of the mast support (42).

4. The releasable mounting system of claim 1, further comprising:
a repulsive forward-facing magnet (64) on the mast support (42);
a repulsive rearward-facing magnet (64) on the mast support (42);
a front repulsive magnet (60) on the shell (44); and
a rear repulsive magnet (62) on the shell (44),
wherein as the mast assembly (80) pivots from the biased upright position towards the forward direction, the repulsive forward-facing magnet (64) moves closer to the front repulsive magnet (60) and a repulsion force is created when the repulsive forward-facing magnet (64) and the front repulsive magnet (60) are in proximity to one another, the repulsion force serving to dampen the fall of the mast assembly (80) in the forward direction, and
wherein as the mast assembly (80) pivots from the biased upright position towards the rearward direction, the repulsive rearward-facing magnet (64) moves closer to the rear repulsive magnet (62) and a repulsion force is created when the repulsive rearward-facing magnet (64) and the rear repulsive magnet (62) are in proximity to one another, the repulsion force serving to dampen the fall of the mast assembly (80) in the rearward direction.

5. The releasable mounting system of claim 1, further comprising:
a portable computer (T) inside the vehicle; and
the rooftop assembly (40) further comprises:

a microcontroller (71) arranged and designed to receive signals or data from the GNSS antenna (92), the anemometer (96), and the at least one sensor (69); and a second antenna (70) arranged and designed to receive and send signals from the microcontroller (71), wherein the portable computer (T) is arranged and designed to receive signals wirelessly from the second antenna (70).

6. The releasable mounting system of claim 5, wherein the microcontroller (71) is a Bluetooth microcontroller and the second antenna (70) is a Bluetooth antenna.

7. The releasable mounting system of claim 5, wherein the rooftop assembly (40) further comprises an electronic receiver (74) adapted to receive signals from the GNSS antenna (92) and provide signals to the microcontroller (71).

8. The releasable mounting system of claim 5, wherein the rooftop assembly (40) further comprises:

a pressure sensor (76) for detecting the ambient pressure and providing a pressure signal to the microcontroller (71); and a temperature sensor (77) for detecting the ambient temperature and providing a temperature signal to the microcontroller (71), wherein the pressure and temperature signals are transmitted wirelessly from the second antenna (70) to the computer (T) inside the vehicle.

9. The releasable mounting system of claim 1, further comprising:

a base assembly (22, 222) having a plurality of magnetic-assisted suction cup mounting assemblies (100) for semi-permanently attaching to a ferrous material surface of the vehicle, wherein the rooftop assembly (40, 240) releasably connects to the base assembly (22, 222).

10. The releasable mounting system of claim 9, wherein the base assembly (22, 222) further comprises:

a base plate (24, 224), the plurality of magnetic-assisted suction cup mounting assemblies (100) adjustably connected to the base plate (24, 224);

each magnetic-assisted suction cup mounting assembly (100) comprising:

a suction cup (108); and at least one magnet (107) providing additional fixturing of the base assembly (22, 222) to the ferrous material surface.

11. The releasable mounting system of claim 10, wherein the base assembly further comprises:

a crossbar (230) connected to a pair of support towers (231), the support towers (231) adapted to be releasably secured to a pair of roof rails on the vehicle rooftop; and the base plate (224) is connected to the crossbar (230).

12. The releasable mounting system of claim 11, wherein the crossbar (230) includes an upper T-slot (**230*t*) extending along the length of the crossbar (230) and an endcap (233) removably enclosing an end of the crossbar (230); and the base assembly (22**) further comprises:

a pair of threaded fasteners (**224*f*) extending from a bottom of the base plate (224**);

a pair of T-nut knobs (225), one T-nut knob (225) threaded onto each threaded fastener (**224*f*); and a pair of T-nuts (227), one T-nut (227) connected to an end of each threaded fastener (224*f*), wherein each T-nut knob (225) is allowed to travel up and down the threaded fastener (224*f*) between the base plate (224) and the T-nut (227), the pair of T-nuts (227) are slidably received within the upper T-slot (230*t*) of the crossbar (230) and the T-nut knobs (225) are tightened securely onto the crossbar (230) when the base plate (224**) is properly positioned on the vehicle rooftop.

13. The releasable mounting system of claim 12, wherein the roof rails are parallel with a longitudinal axis of the vehicle and the crossbar (230) is mounted transverse to the pair of roof rails.

14. The releasable mounting system of claim 11, wherein the crossbar (230) comprises:

a passageway extending to an end of the crossbar (230);

an extension member (235) slidingly received within the passageway; and an endcap (233) attached to the crossbar (230), the endcap (233) adapted to close off the end of the crossbar (230).

15. A releasable mounting system for semi-permanently attaching to a surface of a vehicle, comprising:

a rooftop assembly (40) comprising:

a mast assembly (80) comprising a mast support (42), a tubular member (82, 84), and an upper housing assembly (90) comprising a Global Navigation Satellite System (GNSS) antenna (92) and an anemometer (96), the GNSS antenna (92) mounted above the anemometer (96) at the highest point of the mast assembly (80);

a shell (44) having a pair of upright stanchions (50) aligned parallel to a longitudinal axis of the shell (44), the pair of upright stanchions (50) spaced from one another by a distance allowing the mast support (42) to be positioned therebetween and pivotally mounted to the pair of upright stanchions (50), at least one upright stanchion (50) including a stanchion magnet (56);

the mast support (42) including at least one mounted support magnet (58), wherein an attraction force exists between the stanchion magnet (56) and the support magnet (58) when the mast support (42) is in an upright position, the magnetic attraction force biasing the mast assembly (80) in the upright position, and wherein the mast assembly (80) is allowed to pivot in at least one direction from the upright position; and at least one sensor (69) for detecting the orientation of the mast assembly (80).

16. The releasable mounting system of claim 15, further comprising:

a first repulsive magnet (64) on the mast support (42);

a second repulsive magnet (62) on the shell (44);

wherein as the mast assembly (80) pivots in the at least one direction from the biased upright position, the first repulsive magnet (64) moves closer to the second repulsive magnet (62) and a repulsion force is created when the first and second repulsive magnets magnet (64, 62) are in proximity to one another, the repulsion force serving to dampen the fall of the mast assembly (80) in the at least one direction.

17. The releasable mounting system of claim 15, further comprising:

a portable computer (T) inside the vehicle; and the rooftop assembly (40) further comprises:

a microcontroller (71) arranged and designed to receive signals or data from the GNSS antenna (92), the anemometer (96), and the at least one sensor (69); and a second antenna (70) arranged and designed to receive and send signals from the microcontroller (71), wherein the portable computer (T) is arranged and designed to receive signals wirelessly from the second antenna (70).

18. The releasable mounting system of claim 17, wherein the rooftop assembly (40) further comprises:

a pressure sensor (76) for detecting the ambient pressure and providing a pressure signal to the microcontroller (71); and a temperature sensor (77) for detecting the ambient temperature and providing a temperature signal to the microcontroller (71), wherein the pressure and temperature signals are transmitted wirelessly from the second antenna (70) to the computer (T) inside the vehicle.

19. The releasable mounting system of claim 15, further comprising:

a base assembly (22, 222) having a plurality of magnetic-assisted suction cup mounting assemblies (100) for semi-permanently attaching to a ferrous material surface of the vehicle, wherein the rooftop assembly (40, 240) releasably connects to the base assembly (22, 222).

* * * * *